US011677233B2

(12) United States Patent
Arora et al.

(10) Patent No.: US 11,677,233 B2
(45) Date of Patent: Jun. 13, 2023

(54) SMART BUS PLUG REMOTE ACTUATION, MONITORING, AND CONTROL

(71) Applicant: EATON INTELLIGENT POWER LIMITED, Dublin (IE)

(72) Inventors: Sonal Arora, Pune (IN); Kundan Deore, Nashik (IN); Prashant Pandurang Rode, Pune (IN); Gordon Pettersen, Greenwood, SC (US); Archit Agarwal, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 368 days.

(21) Appl. No.: 16/681,083

(22) Filed: Nov. 12, 2019

(65) Prior Publication Data

US 2021/0143631 A1   May 13, 2021

(51) Int. Cl.
*H02H 1/00* (2006.01)
*H02H 7/22* (2006.01)
*H01R 25/16* (2006.01)
*H01R 31/06* (2006.01)
*H01R 13/713* (2006.01)
*H01R 13/70* (2006.01)

(52) U.S. Cl.
CPC .............. *H02H 7/22* (2013.01); *H01R 13/701* (2013.01); *H01R 13/7135* (2013.01); *H01R 25/162* (2013.01); *H01R 31/065* (2013.01); *H02H 1/0061* (2013.01)

(58) Field of Classification Search
CPC ............ H02H 7/22; H02H 7/263; H02H 3/08; H02H 1/0061; H01R 25/162; H01R 31/065; H01R 13/7135; H01R 13/701

USPC .......................................................... 361/114
See application file for complete search history.

(56) References Cited

U.S. PATENT DOCUMENTS

| 3,986,155 | A | * | 10/1976 | Kosup | H01H 71/1009 200/50.02 |
| 5,964,815 | A | * | 10/1999 | Wallace | B60R 21/01 180/282 |
| 6,507,255 | B1 | * | 1/2003 | Ennis | H01H 47/226 335/13 |
| 2015/0326001 | A1 | * | 11/2015 | Emerson | H02J 13/00001 361/93.2 |
| 2017/0300397 | A1 | * | 10/2017 | Barrenscheen | G06F 13/364 |

* cited by examiner

*Primary Examiner* — Jared Fureman
*Assistant Examiner* — Lucy M Thomas
(74) *Attorney, Agent, or Firm* — Squire Patton Boggs (US) LLP

(57) ABSTRACT

A power distribution system includes a plurality of bus plugs. Each of a respective bus plug of the plurality of bus plugs includes an electrical switch configured to selectively control a corresponding energization of the respective bus plug and an actuator operable to control a corresponding electrical switch. The system includes a remote application having commands defining the energization of at least one of the plurality of bus plugs. The system further includes a communication module configured to communicate the commands from the remote application to the at least one of the plurality of bus plugs. The commands cause the corresponding actuator to control the corresponding electrical switch. Methods of controlling energization of a bus plug with a remote application and communication module configured to operate an actuator are also provided.

20 Claims, 19 Drawing Sheets

SMART BUS PLUG REMOTE ACTUATION, MONITORING, AND CONTROL

FIELD OF INVENTION

The present disclosure relates to bus plugs. More specifically, the present disclosure relates to apparatus and methods for remote actuation of bus plugs including remotely monitoring and controlling bus plugs.

BACKGROUND

Electric power can be supplied from an active device (e.g., power source) to a passive device (e.g., load source). For example, power stations can generate electric power; electric power companies can supply the electric power through an electric circuit (e.g., electric power grid) to consumers; and consumers can employ one or more devices to convert the electric power into energy to accomplish a variety of objectives. Consumers of electricity include household and residential consumers as well as commercial and industrial consumers.

An electrical distribution system, employing bus plugs connected to a busway, provides localized power distribution to one or more electronic devices (e.g., panels with devices having decision making capability defining a closed loop system), electrical devices (e.g., panels without decision making capability), and electromechanical devices (e.g., motor load).

Bus plugs are employed in a variety of applications and can be positioned in a variety of locations. Many applications include a plurality of bus plugs at least some of which are positioned at locations not easily accessible to an operator. An operator may wish to monitor or control one or more aspects of one or more bus plugs. For example, an operator may wish to monitor a status, temperature, energization, or other characteristic of a bus plug. Additionally, an operator may wish to control a bus plug to electrically energize or de-energize electronic devices, electrical devices, and electromechanical devices selectively receiving electric power from a busway to which the bus plug is connected.

Typically, an operator who controls a bus plug manually interacts with the bus plug directly at the physical site where the bus plug is located. When bus plugs are inaccessible to an operator or when a plurality of bus plugs are employed, it may be dangerous, impractical, and inefficient for the operator to physically interact with each bus plug. It is desirable, therefore, to remotely control energization of one or more bus plugs. Accordingly, for safe and effective distribution of electric power, devices and methods for remotely controlling energization of bus plugs are needed.

SUMMARY

In one embodiment, a power distribution system includes a plurality of bus plugs. Each of a respective bus plug of the plurality of bus plugs includes an electrical switch configured to selectively control a corresponding energization of the respective bus plug. The system includes an actuator operable to control a corresponding electrical switch, and a remote application having commands defining the energization of at least one of the plurality of bus plugs. The system further includes a communication module configured to communicate the commands from the remote application to the at least one of the plurality of bus plugs. The commands cause the corresponding actuator to control the corresponding electrical switch.

In another embodiment, a power distribution system includes a plurality of bus plugs that communicate over a wired or wireless connection. Each of a respective bus plug of the plurality of bus plugs includes an electrical switch configured to selectively control a corresponding energization of the respective bus plug, an actuator operable to control a corresponding electrical switch, and a handle operable to control the corresponding electrical switch.

In yet another embodiment, a bus plug includes an electrical switch configured to selectively control energization of the bus plug, an actuator operable to control the electrical switch, and a measurement device configured to monitor one or more parameters of the bus plug. At least one of the electrical switch, the actuator, and the measurement device is configured to communicate with a communication module over a wired or wireless connection. At least one of the actuator and the electrical switch is configured to operate in response to measurement of a predetermined parameter by the measurement device.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
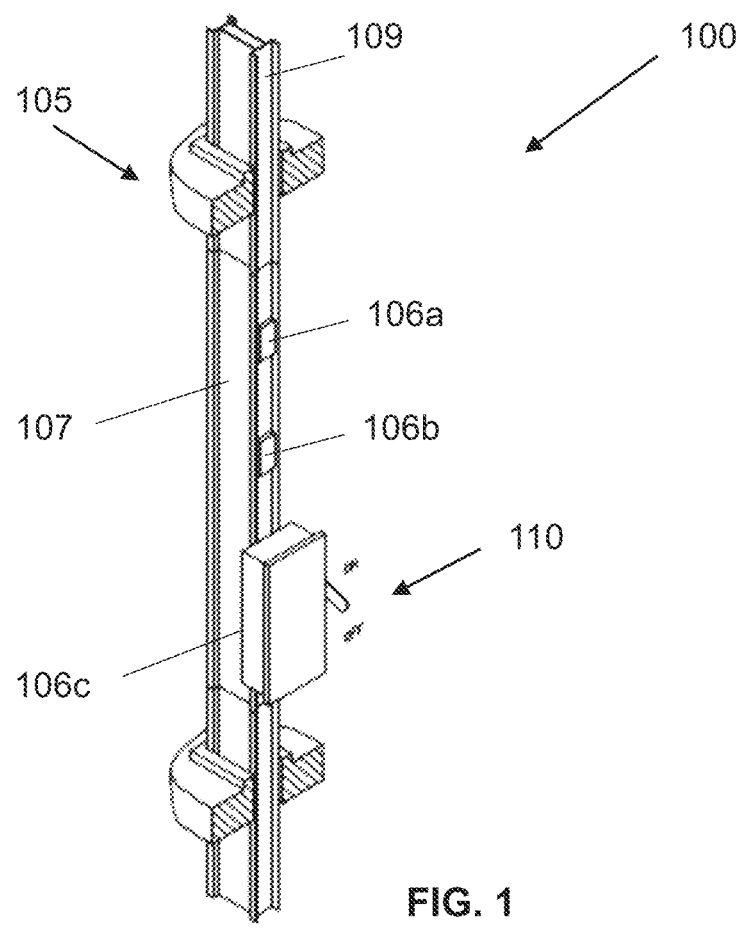
FIG. 1 illustrates a perspective view of a power distribution system in accordance with embodiments of the disclosure.

FIG. 1 illustrates an exemplary embodiment of a power distribution system 100 including a busway 105 and a bus plug 110. The bus plug 110 can be any of a power take-off unit, busway fitting, and tap-off device. The busway 105 includes a duct 107 having one or more plug-in openings shown as electrically conductive sections 106a, 106b, 106c (electrically conductive section 106c is covered by bus plug 110 and thus not visible in this view). The electrically conductive sections 106a, 106b, 106c are electrically connected to a bus bar 109 to conduct and distribute an electrical current through the busway 105. The bus plug 110 connects to the busway 105 at the one or more electrically conductive sections 106a, 106b, 106c and functions as an electrical connector to electrically connect one or more electronic devices, electrical devices, and electromechanical devices (not shown) with the electrical current of the bus bar 109. The bus plug 110 and busway 105 can include brick-insulated protection, which prevents accidental contact with and between electrically-active, live parts and maintains a predetermined creepage clearance distance.

For example, similar to an electrical cord of a household electrical device with an integrated plug that can connect (plug-in) to and disconnect (unplug) from a residential electrical receptacle supplied with electrical current from hard-wired electrical wiring, the bus plug 110 connects to and disconnects from the busway 105. The power distribution system 100 provides localized power distribution to one or more electronic devices (e.g., panels with devices having decision making capability defining a closed loop system), electrical devices (e.g., panels without decision making capability), and electromechanical devices (e.g., motor load). Although illustrated in a vertical orientation, the power distribution system 100 can be oriented at any angle and extend in any direction.

The power distribution system 100 can be employed in a variety of locations where electrical distribution is desired including factories, commercial buildings, data centers, and industrial facilities. Additionally, the power distribution system 100 can be employed indoors or outdoors and can be provided for permanent installation (e.g., in a building) or for temporary installation (e.g., at a construction site). In some embodiments, the busway 105 can be installed overhead (e.g., on a ceiling), and the bus plug 110 can connect to the busway 105 providing electrical current from the busway 105 to one or more electrical devices located on the floor below the busway 105. Further, the busway 105 and the bus plug 110 can be installed in a vertical orientation (e.g., extending through multiple stories and floors of a building, such as a high-rise office or hotel, or an apartment complex). Although commonly used in industrial applications employing high electrical current for large electronic devices, electrical devices, and electromechanical devices, unless otherwise noted, the power distribution system 100 of the present disclosure can be employed in a variety of applications for electrical distribution including residential and commercial applications with a variety of electronic devices, electrical devices, and electromechanical devices.

The power distribution system 100 including the bus plug 110 and the busway 105 can include or be employed either alone or in combination with a variety of electrical components. For example, the bus plug 110 and the busway 105 can include wires, capacitors, inductors, transformers, reducers, amplifiers, fuses, switches, connectors, detectors, sensors, transducers, resonators, semiconductors, actuators, cables, timers, tubes, suppressors, and terminals oriented to provide one or more operations or functions with respect to distribution of electric power from, for example, one or more active devices to one or more passive devices. Likewise, a size or electrical rating of any component of the bus plug 110 and the busway 105 can be selected and modified depending on a particular application in which the bus plug 110 and the busway 105 may be used, a particular ampacity of electrical current employed, a particular voltage rating, or other factors dictating a size or electrical rating of an electrical component.

The action of connecting and disconnecting a bus plug 110 relative to a busway 105 is known as "racking." A "rack-in/plug-in" operation electrically connects the bus plug 110 with a conductive section 106a, 106b, 106c of the busway 105 such that an electrical current is conducted from the bus bar 107 to the bus plug 110, whereby the bus plug 110 is active or energized. Conversely, a "rack-out/plug-out" operation electrically disconnects the bus plug 110 from a conductive section 106a, 106b, 106c of the busway 105 such that the bus plug 110 is inactive or de-energized and not receiving electrical current from the bus bar 107.

The ability to connect and disconnect a bus plug 110 relative to a busway 105 provides a dynamic power distribution system 100 that can be changed and modified over time to accommodate different electronic devices, electrical devices, and electromechanical devices, different placement or movement of electronic devices, electrical devices, and electromechanical devices, and different layouts and floor-plans.

A technician can disconnect the bus plug 110 from the busway 105 to deactivate the electronic devices, electrical devices, and electromechanical devices and perform maintenance on the deactivated electronic devices, electrical devices, and electromechanical devices or rearrange the power distribution system 100 without the risk of electrocution. After performing the maintenance, the technician can then reconnect the bus plug 110 to the busway 105 or operate the electrical switch to reestablish an electrical connection with the repaired, replaced, or rearranged electronic devices, electrical devices, and electromechanical devices.

Figure 2:
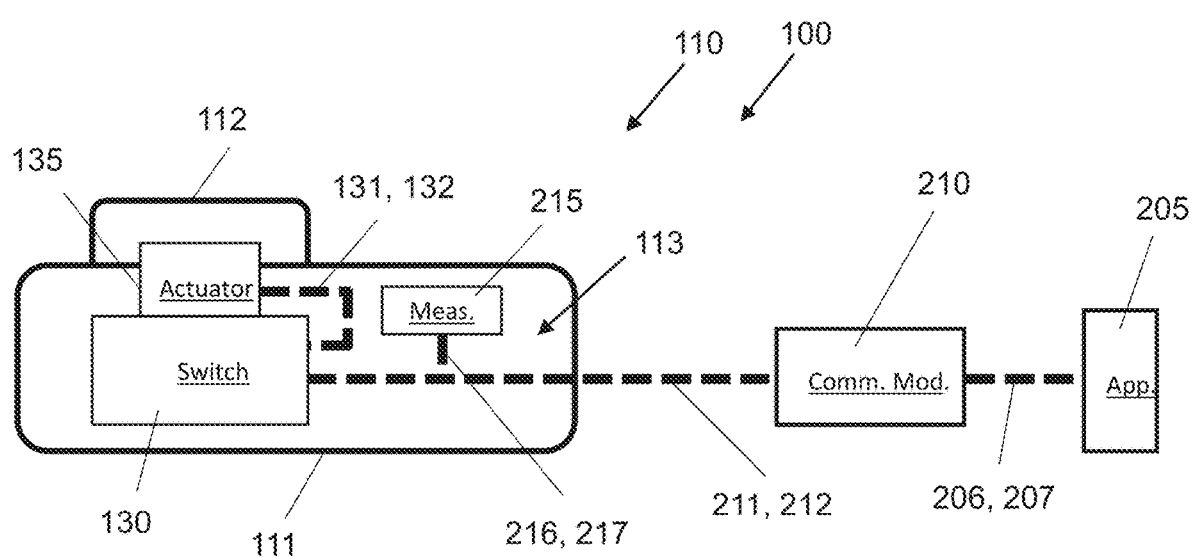
FIG. 2 is a schematic illustration of a bus plug including an actuator operable by a communication module and a remote application.

FIG. 2 schematically illustrates the bus plug 110 of FIG. 1 with the busway 105 removed for clarity. The bus plug 110 includes an electrical switch 130 to selectively control the energization of the bus plug 110. The electrical switch 130 can provide an ON/OFF control operable in standard operating conditions and abnormal operating conditions. Just as racking of the bus plug 110 controls the energization of the bus plug 110, the electrical switch 130 is operable to control the flow of electrical current from the busway 105 to the bus plug 110. For example, a technician can selectively energize and de-energize the bus plug 110 with the electrical switch 130. The electrical switch 130 can be a circuit breaker or overcurrent protection device that connects an electrical load to the busway 105 while providing overcurrent, short circuit, and ground fault protection for the load. In the event of an electrical overload, the circuit breaker trips and removes power from the load before damage to the bus plug 110 and load occurs. To restore power to the load, the circuit breaker is reset.

The bus plug 110 further includes an actuator 135 operable to control the electrical switch 130. The electrical switch 130 can be located within an interior volume 113 of a housing 111 and cover 112 of the bus plug 110. The cover 112 is constructed to accommodate a shape and size of the actuator 135 that extends beyond a boundary of the internal volume 113 of the housing 111. The actuator 135 can include a rotary actuator (e.g., motor), a linear actuator (e.g., solenoid), and any other mechanical device (e.g., hydraulic, pneumatic) operable to impart a force on the electrical switch 130 to work the electrical switch 130. One or more of the electrical switch 130 and the actuator 135 can be positioned inside the housing 111 or outside the housing 111 with or without a cover 112. Placing components inside the housing 111 can protect them and prevent accidental interaction, while placing components outside exposes them to air flow and make the parts readily accessible for maintenance or replacement.

In turn, the electrical switch 130 is operable based on the one or more forces imparted by the actuator 135. The electrical switch 130 includes a movable lever or control knob (not shown) that interacts with the actuator 135 to selectively operate the electrical switch 130, thereby energizing or de-energizing the bus plug 110. In further embodiments, the actuator 135 and the electrical switch 130 are operable based on one or more of a mechanical force, and an electro-mechanical or electrical action (e.g., hybrid or solid state switch) to selectively energize and de-energize the bus plug 110. In other words, the actuator 135 selectively trips/ON and resets/OFF a circuit breaker of the electrical switch 130 to provide power to or remove power from an electrical device connected to the bus plug 110.

The electrical switch 130 can be employed according to an Arcflash Reduction Maintenance System (ARMS) that uses a separate analog trip circuit that provides faster interruption times compared to the standard, digital "instantaneous" protection. Thus, an accelerated instantaneous trip can reduce the arc flash energy level that is released and, in turn, allow a technician to have reduced personal protective equipment (PPE). Reduced PPE offers better worker comfort and mobility and increases efficiency.

The power distribution system 100 includes a communication module 210 and a remote application 205. The remote application 205 provides commands defining the energization of the bus plug 110. The communication module 210 is configured to communicate the commands from the remote application 205 to the bus plug 110. The commands operate the actuator 135 to control the electrical switch 130. For example, the remote application 205 can include a user interface (e.g., button, knob, switch, graphical user interface, control panel) operable to permit a user to input a command which the communication module then communicates to the bus plug 110.

Although illustrated as separate components in FIG. 2, in some embodiments, the communication module 210 can be integral with the remote application 205. Alternatively, the communication module 210 can be integral with the bus plug 110. Moreover, the electrical switch 130 and the actuator 135 can be provided in a variety of configurations, sizes, and styles, depending on, for example, size constraints, the operation mechanism of the actuator 135 and the electrical switch 130, the load requirements of the electrical switch 130, temperature and environment in which the bus plug 110 may be employed, and other configurations, none of which is intended to limit the present disclosure. The actuator 135 can be a linear actuator, solenoid, or other component that provides controlled movement.

The remote application 205 and communication module 210 are configured to operate the actuator 135 remotely at a distance that can be greater than the distance at which an operator would be positioned when physically or manually interacting with the bus plug 110. For example, the remote application 205 can include a mobile or web-based application 205 that interacts with the communication module 210 based on a wired 206 or wireless 207 connection. Likewise, the communication module 210 interacts with the bus plug 110 any one or more components of the bus plug 110 (e.g., switch 130, actuator 135) based on a wired 211 or wireless 212 connection, and the actuator 135 and the electrical switch 130 interact based on a wired 131 or wireless 132 connection. Thus, the remote application 205 and the communication module 210 are configured to operate from a variety of locations relative to the bus plug 110 including, but not limited to, different rooms within a building, different buildings, different cities, states, or countries, and remote locations having a wired or wireless connection to a network, internet, satellite, antenna, cellular or other communication platform.

In one example, a user issues a command using the remote application 205 to de-energize the bus plug 110. The command is delivered via connection 206, 207 to the communication module 210, and the communication module 210 sends the command to the bus plug 110 via connection 211, 212. The actuator 135 receives the command either directly from connection 211, 212 or indirectly from connection 131, 132 (e.g., via a relay). Based on the command, the actuator 135 operates to mechanically force the switch 130 off (e.g., into a de-energized state). In like manner, the user can issue a command to turn on (e.g., re-energize) the bus plug 110 using mechanical force from the operation of the actuator 135.

The communication module 210 can include one or more of a router, a gateway, a modem, a programmable logic controller (PLC), a relay, or other device having a communication protocol. In some embodiments, the communication module 210 is configured to communicate one or more parameters from the bus plug 110 to the remote application 205. For example, the bus plug 110 can include a sensor, meter, current transformer, thermocouple, humidity sensor, or other measurement device 215 configured to monitor one or more parameters (e.g., current, voltage, power, temperature, time, location) and transmit the parameters from the bus plug 110 to the remote application 205 through the communication module 210. The measurement device 215 can be a separate component or a component integral with another component (e.g., electrical switch 130) of the bus plug 110.

The measurement device 215 is shown as having a wired 216 or wireless 217 connection with the connection 211, 212 that connects one or more of the communication module 210 and, the switch 130, the actuator 136, and the remote application 205. In other embodiments, the measurement device 215 can measure one or more parameters and transfer the information from the device 215 to the remote application 205 directly or indirectly through one or more components or connections without departing from the scope of the disclosure. The communication module 210 and the remote application 205 can communicate based on a dynamic host configuration protocol (DHCP) or other network protocol that enables a server to automatically assign an IP address to a computer.

Software, firmware, hardware, and other computer components can be employed in combination with the power distribution system 100 in accordance with the disclosure. The remote application 205 can include additional features including password protection, limited access and operability based on an operator's credentials, emergency stop features, component testing and configuration options, and other controls and commands. A user may also remotely monitor and track parameters of the electrical switch 130. For example, the electrical switch 130 can include a trip unit with an algorithm that provides real-time information of conditions including operation status, short circuit fault levels, operational time, internal temperature, overloads, and other diagnostic details. The trip unit provides additional protection and additional level of control to the bus plug 110 and communicate information back to a user through the communication module 210. For example, a trip unit can automatically open under specific conditions such as overloads to cut the electrical connection to the switch 130. In this instance, the electrical switch 130 acts as a breaker and sends a signal to the trip unit, which sends a signal to the communication module 210 and the remote application 205 notifying a user that the switch 130 has tripped. Once tripped, a user can manually close the breaker to re-establish the electrical connection to the switch 130.

One or more features of the bus plug 110 disclosed with respect to FIG. 2 are described with respect to other figures of the disclosure to provide additional embodiments of the present disclosure. Accordingly, the bus plugs 110 shown schematically in FIGS. 3-13 can include one or more features of bus plug 110 including the communication module 210 and the remote application 205. For simplicity and not limitation, like numerals are used for like components, and like components are considered to include the same or similar features disclosed. Further, although described with respect to a single bus plug, the communication module 210 can be configured to communicate the one or more commands from the remote application 205 to one or more of a plurality of bus plugs to control operation of one or more of the plurality of bus plugs. Accordingly, each bus plug of the plurality of bus plugs can include one or more features of bus plug 110.

One or more features of the bus plug 110 disclosed with respect to FIG. 2 are described with respect to other figures of the disclosure to provide additional embodiments of the present disclosure. Accordingly, bus plugs shown in FIGS. 3-24 can include one or more features of bus plug 110. For simplicity and not limitation, like numerals are used for like components, and like components are considered to include the same or similar features disclosed.

FIGS. 3-10, schematically illustrate different embodiments of the bus plug 110 and are provided to show some, but not all, examples of various bus plug configurations and methods of operation in accordance with embodiments of the disclosure. The various configurations can be employed alone or in combination and provide examples of various ways in which a user can acquire information from and provide information to the bus plug 110.

Figure 3:
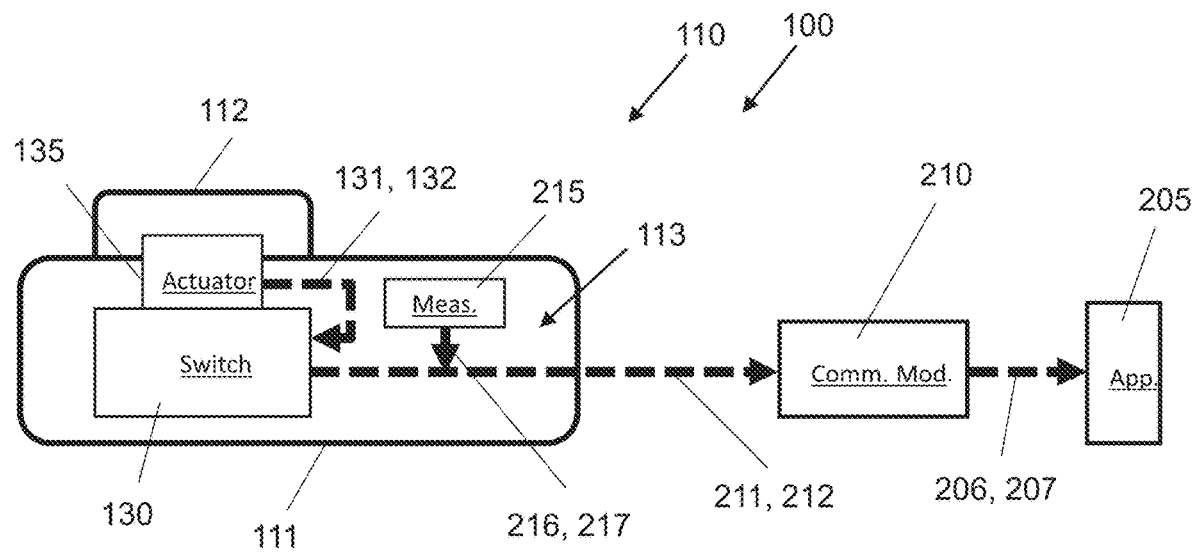
FIGS. 3-10 are schematic illustrations of embodiments of a bus plug including an actuator operable by a communication module and a remote application.

FIG. 3 provides an example configuration where a user acquires data from the bus plug 110. For example, one or more of the switch 130, actuator 135, and measurement device 215 communicates with the communication module 210 which communicates that information to the remote application 205 by connection 206, 207. Data from the actuator 135 can be communicated to the switch 130 by connection 131, 132. Data from the switch 130 can be communicated to the communication module 210 by connection 211, 212, and data from measurement device 215 can be communicated to connection 211, 212 by connection 216, 217.

Figure 4:
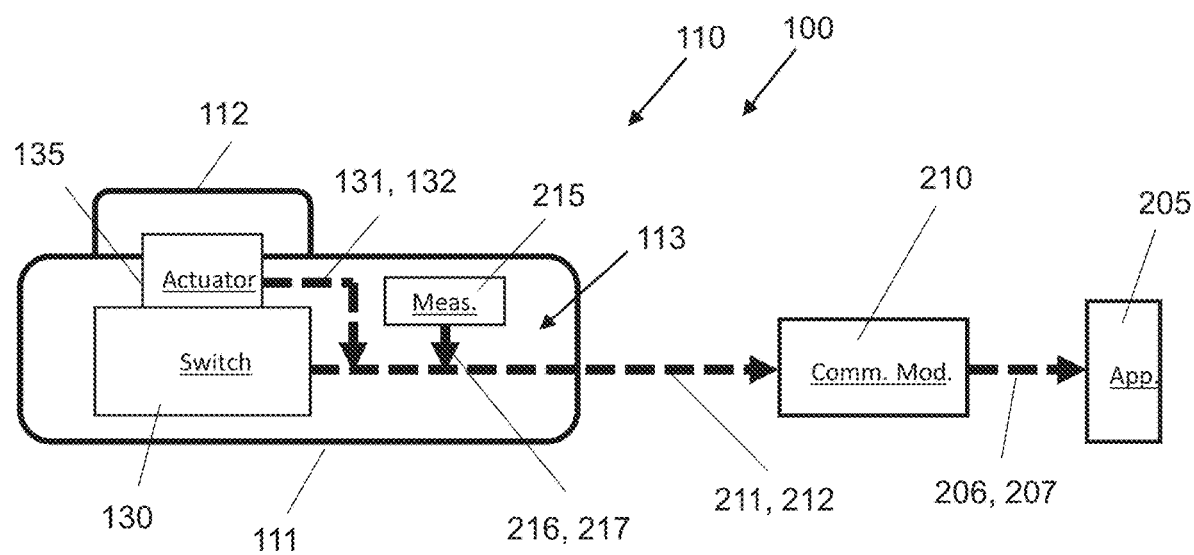

FIG. 4 provides another example configuration where a user acquires data from the bus plug 110. For example, one or more of the switch 130, actuator 135, and measurement device 215 communicates with the communication module 210 which communicates that information to the remote application 205 by connection 206, 207. Data from the switch 130 can be communicated to the communication module 210 by connection 211, 212. Data from the actuator 135 can be communicated to connection 211, 212 by connection 131, 132, and data from measurement device 215 can be communicated to connection 211, 212 by connection 216, 217.

Figure 5:
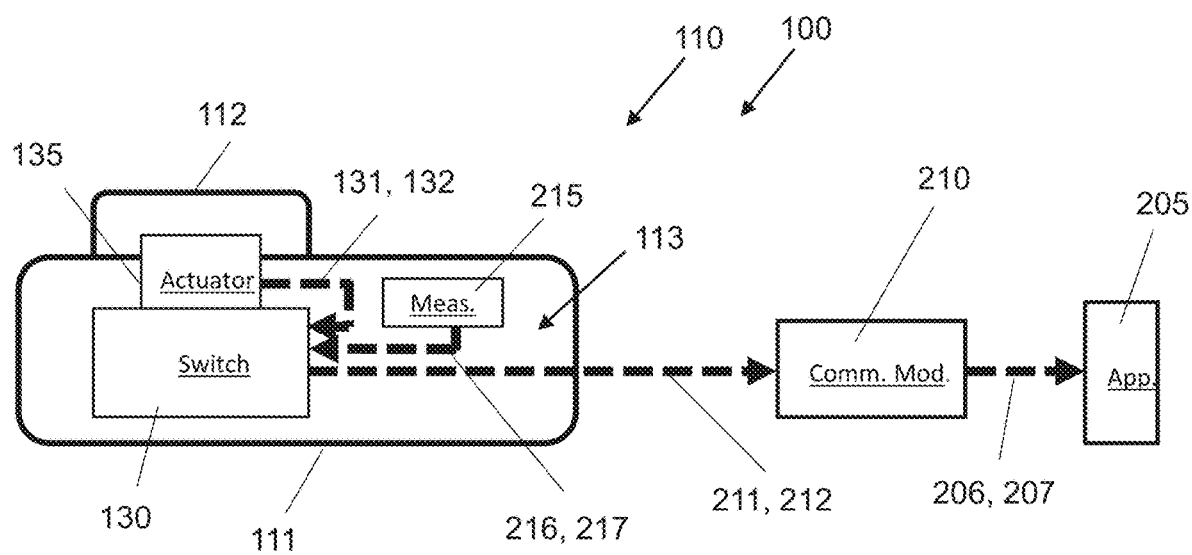

FIG. 5 provides another example configuration where a user acquires data from the bus plug 110. For example, one or more of the switch 130, actuator 135, and measurement device 215 communicates with the communication module 210 which communicates that information to the remote application 205 by connection 206, 207. Data from the actuator 135 can be communicated to the switch 130 by connection 131, 132, and data from measurement device 215 can be communicated to the switch 130 by connection 216, 217. Data from the switch 130 can then be communicated to the communication module 210 by connection 211, 212.

Figure 6:
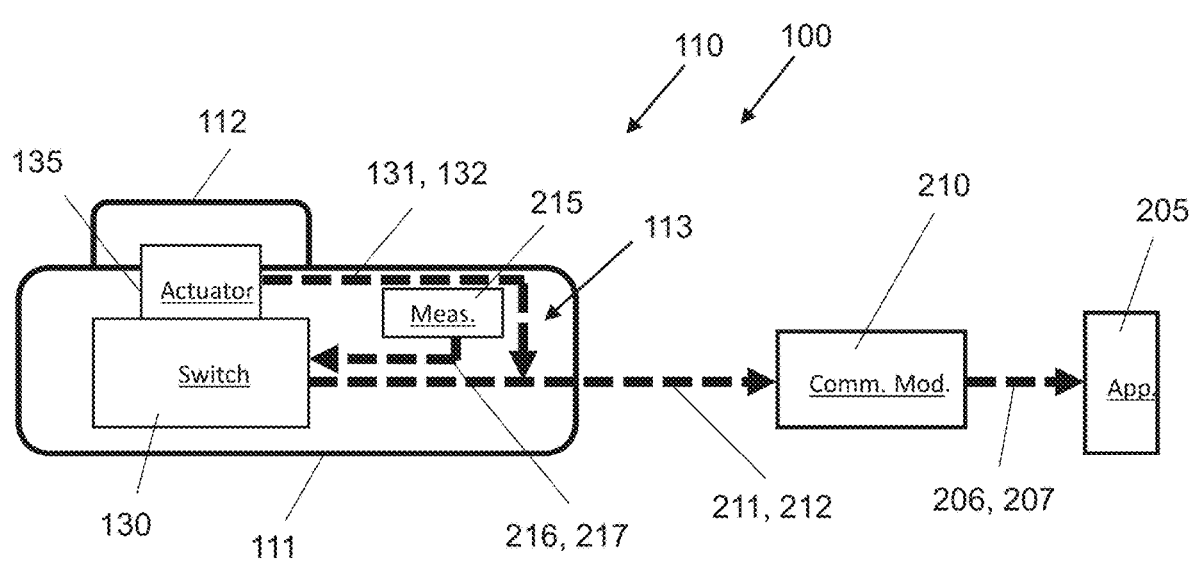

FIG. 6 provides another example configuration where a user acquires data from the bus plug 110. For example, one or more of the switch 130, actuator 135, and measurement device 215 communicates with the communication module 210 which communicates that information to the remote application 205 by connection 206, 207. Data from measurement device 215 can be communicated to the switch 130 by connection 216, 217. Data from the actuator 135 can be communicated to connection 211, 212 by connection 131, 132. Data from the switch 130 and the actuator 135 can then be communicated to the communication module 210 by connection 211, 212.

Figure 7:
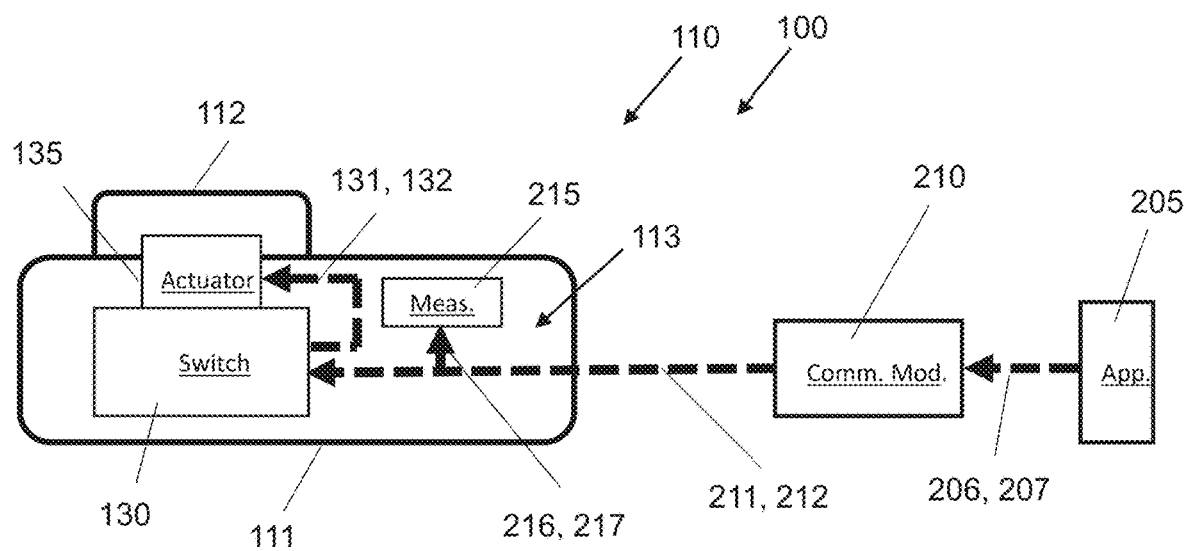

FIG. 7 provides an example configuration where a user provides data to the bus plug 110 to configure or control the bus plug 110. For example, information from the remote application 205 is provided to the communication module 210 by connection 206, 207. Data from the communication module 210 is provided by connection 211, 212 to the switch 130 and to the measurement device 215 by connection 216, 217. Data from the switch 130 can be communicated to the actuator 135 by connection 131, 132.

Figure 8:
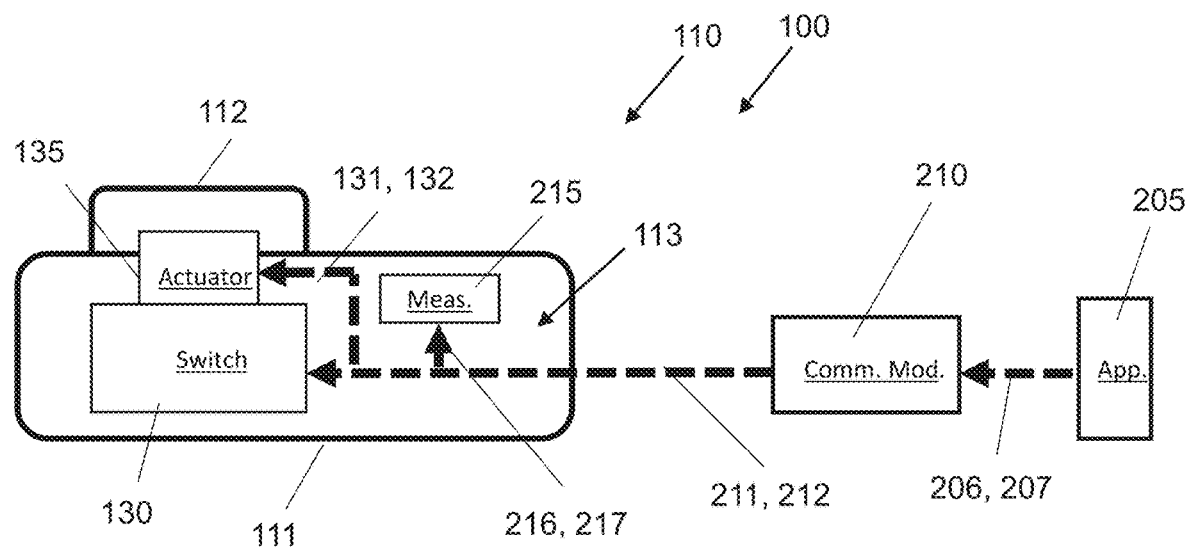

FIG. 8 provides another example configuration where a user provides data to the bus plug 110 to configure or control the bus plug 110. For example, information from the remote application 205 is provided to the communication module 210 by connection 206, 207. Data from the communication module 210 is provided by connection 211, 212 to the switch 130, to the measurement device 215 by connection 216, 217, and to the actuator 135 by connection 131, 132.

Figure 9:
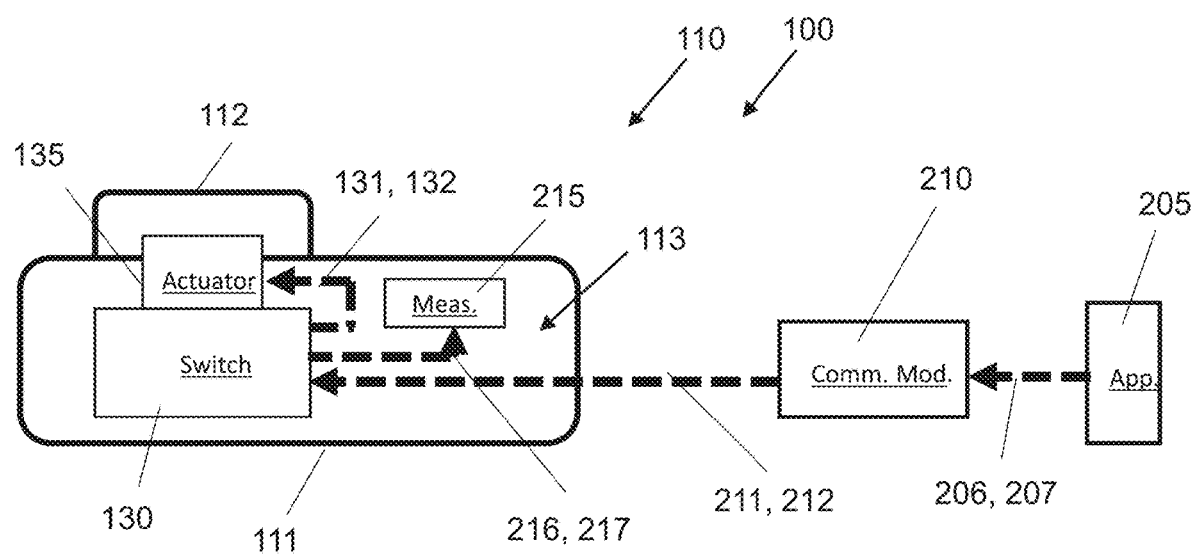

FIG. 9 provides another example configuration where a user provides data to the bus plug 110 to configure or control the bus plug 110. For example, information from the remote application 205 is provided to the communication module 210 by connection 206, 207. Data from the communication module 210 is provided by connection 211, 212 to the switch 130. Data from the switch 130 can be communicated to the actuator 135 by connection 131, 132 and to the measurement device 215 by connection 216, 217.

Figure 10:
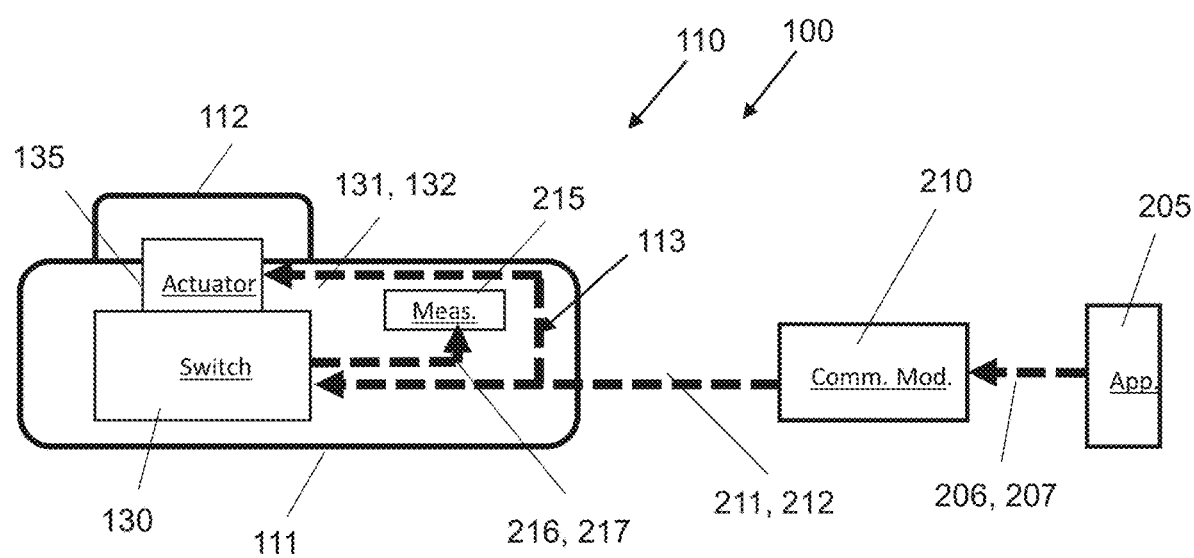

FIG. 10 provides another example configuration where a user provides data to the bus plug 110 to configure or control the bus plug 110. For example, information from the remote application 205 is provided to the communication module 210 by connection 206, 207. Data from the communication module 210 is provided by connection 211, 212 to the switch 130 and to the actuator 135 by connection 131, 132. Data from the switch 130 can be communicated to the measurement device 215 by connection 216, 217.

Figure 11:
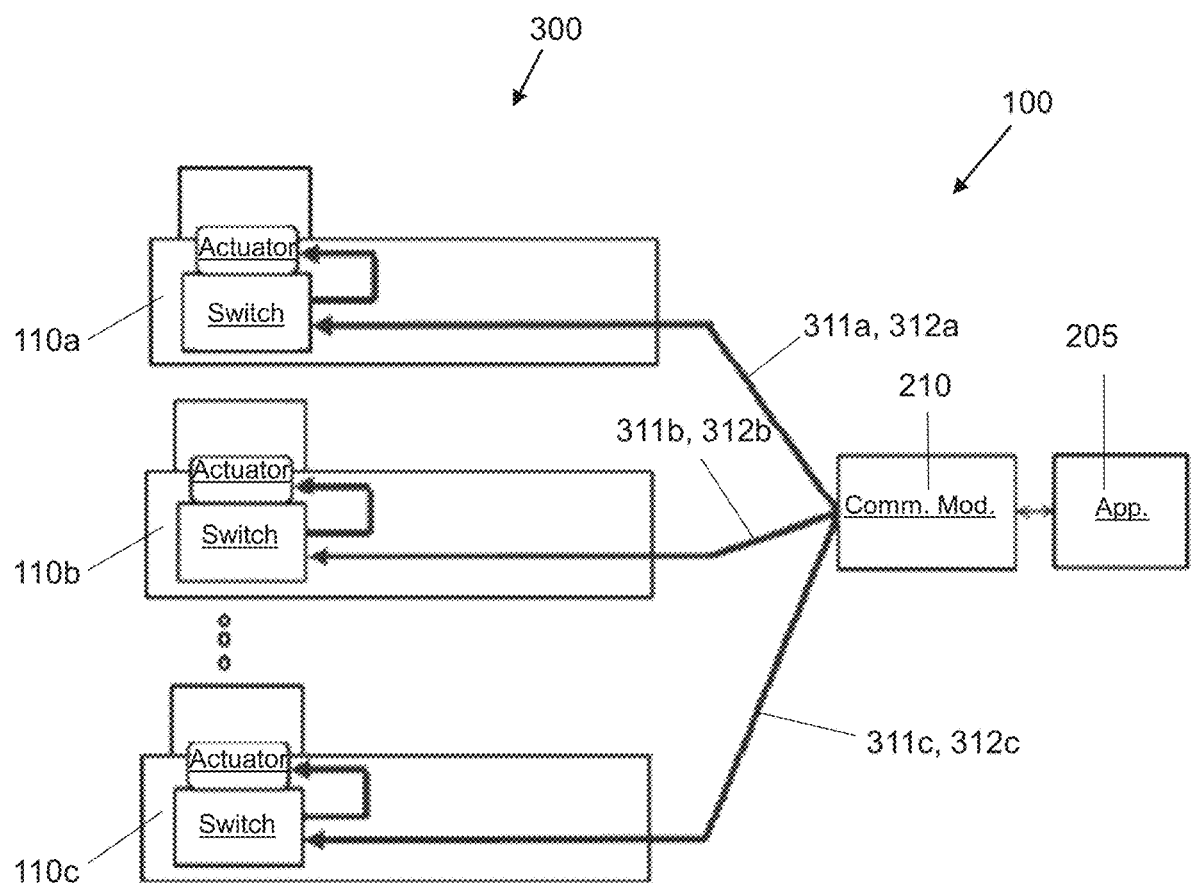
FIG. 11 is a schematic illustration of a plurality of bus plugs connected in a first manner and operable by a communication module and a remote application.
Figure 12:
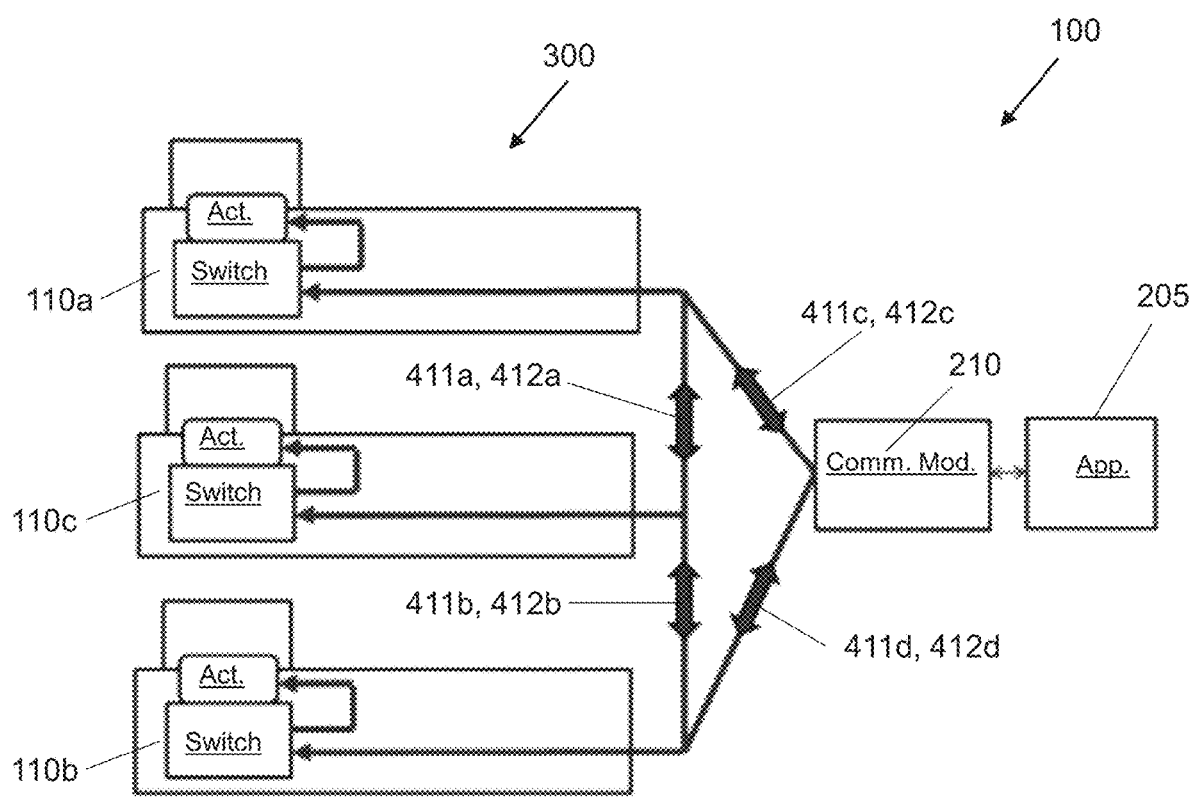
FIG. 12 is a schematic illustration of a plurality of bus plugs connected in a second manner and operable by a communication module and a remote application.
Figure 13:
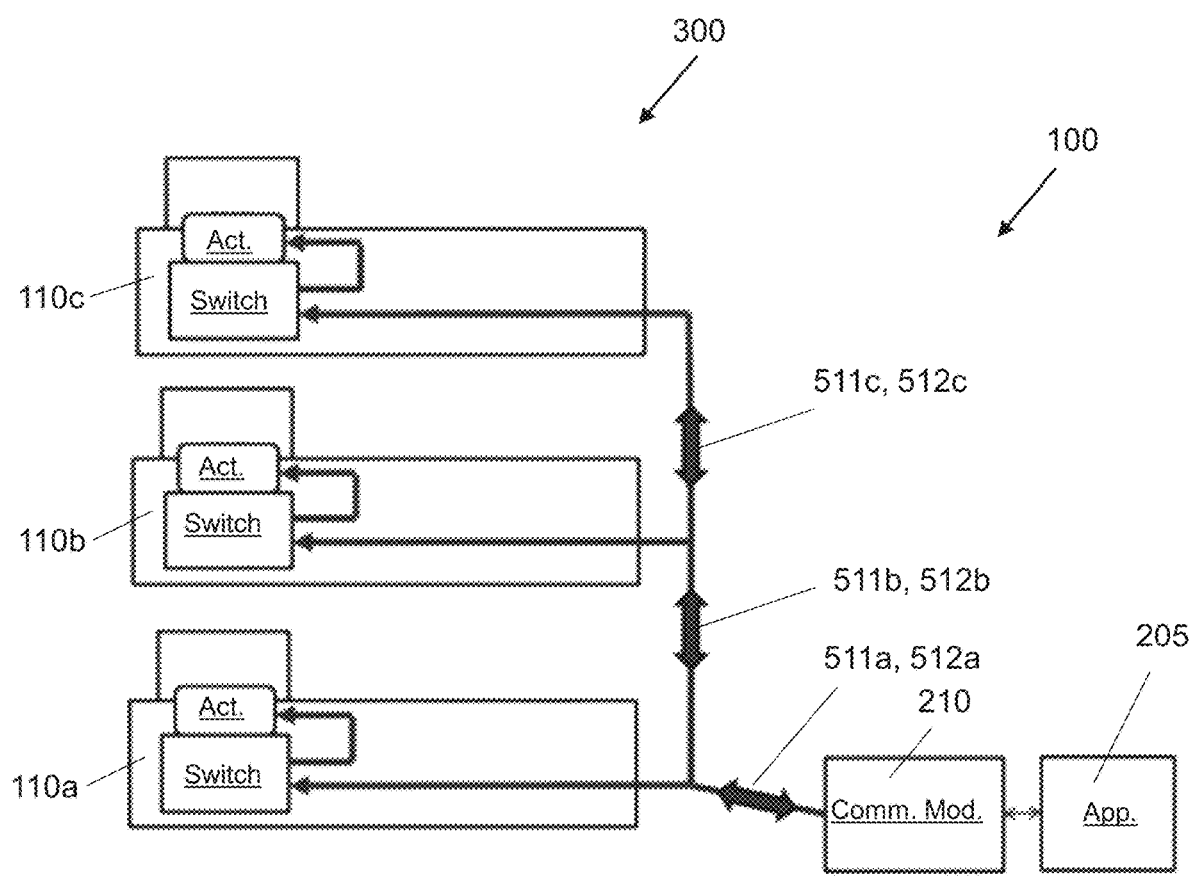
FIG. 13 is a schematic illustration of a plurality of bus plugs connected in a third manner and operable by a communication module and a remote application.

As schematically illustrated in FIGS. 11-13, the communication module 210 is further configured to communicate the commands from the remote application 205 to one or more of a plurality of bus plugs 300 to control operation of one or more of the plurality of bus plugs 300. The plurality of bus plugs 300 are configured to communicate one or more parameters from a measurement device 215 (FIG. 2) to the remote application 205 for monitoring of the one or more of the plurality of bus plugs 300.

For example, FIG. 11 shows the plurality of bus plugs 300 controlled and monitored by one centralized communication module 210 and remote application 205. The plurality of bus plugs 300 are connected in a linear or bidirectional manner (e.g., daisy chain) with the centralized communication module 210. A star topology is a topology in which all nodes are individually connected to a central connection point, such as a hub or a switch. While a star topology uses more cable than some other topologies, if a cable fails, only one node will be brought down.

For example, bus plug 110a is linearly or bi-directionally connected to communication module 210 via wired 311a or wireless 312a connection, and bus plug 110b is linearly or bi-directionally connected to communication module 210 via wired 311b or wireless 312b connection. Bus plug 110c, representing the $n^{th}$ bus plug in the plurality of bus plugs 300, is linearly or bi-directionally connected to communication module 210 via wired 311c or wireless 312c connection. A user can monitor or control one, more than one, or all of the bus plugs 110a, 110b, 110c of the plurality of bus plugs 300 from one remote application 205 with one communication module 210 employing a daisy chain configuration.

FIG. 12, shows the plurality of bus plugs 300 connected in a closed loop daisy chain with the centralized communication module 210. A ring network is a network topology in which each node connects to two other nodes, forming a single continuous pathway for signals through each node, thus defining a ring. Data travels from node to node, with each node along the way handling every packet.

For example, bus plug 110a is interconnected to bus plug 110c, representing the $n^{th}$ bus plug in the plurality of bus plugs 300, via a wired 411a or wireless 412a connection, and bus plug 110c is interconnected to bus plug 110b, via a wired 411b or wireless 412b connection. Bus plug 110a is connected to communication module 210 via a wired 411c or wireless 412c connection, and bus plug 110b is connected to communication module 210 via a wired 411d or wireless 412d connection. A user can monitor or control one, more than one, or all of the bus plugs 110a, 110b, 110c of the plurality of bus plugs 300 from one remote application 205 with one communication module 210 employing a closed loop daisy chain configuration.

FIG. 13 shows the plurality of bus plugs 300 connected in an open loop daisy chain with the centralized communication module 210. For example, bus plug 110a is interconnected to bus plug 110b via a wired 511b or wireless 512b connection, and bus plug 110b is interconnected to bus plug 110c, representing the $n^{th}$ bus plug in the plurality of bus plugs 300, via a wired 511c or wireless 512c connection. Bus plug 110a is connected to communication module 210 via a wired 411a or wireless 412a connection. A user can monitor or control one, more than one, or all of the bus plugs 110a, 110b, 110c of the plurality of bus plugs 300 from one remote application 205 with one communication module 210 employing an open daisy chain configuration.

Figure 14:
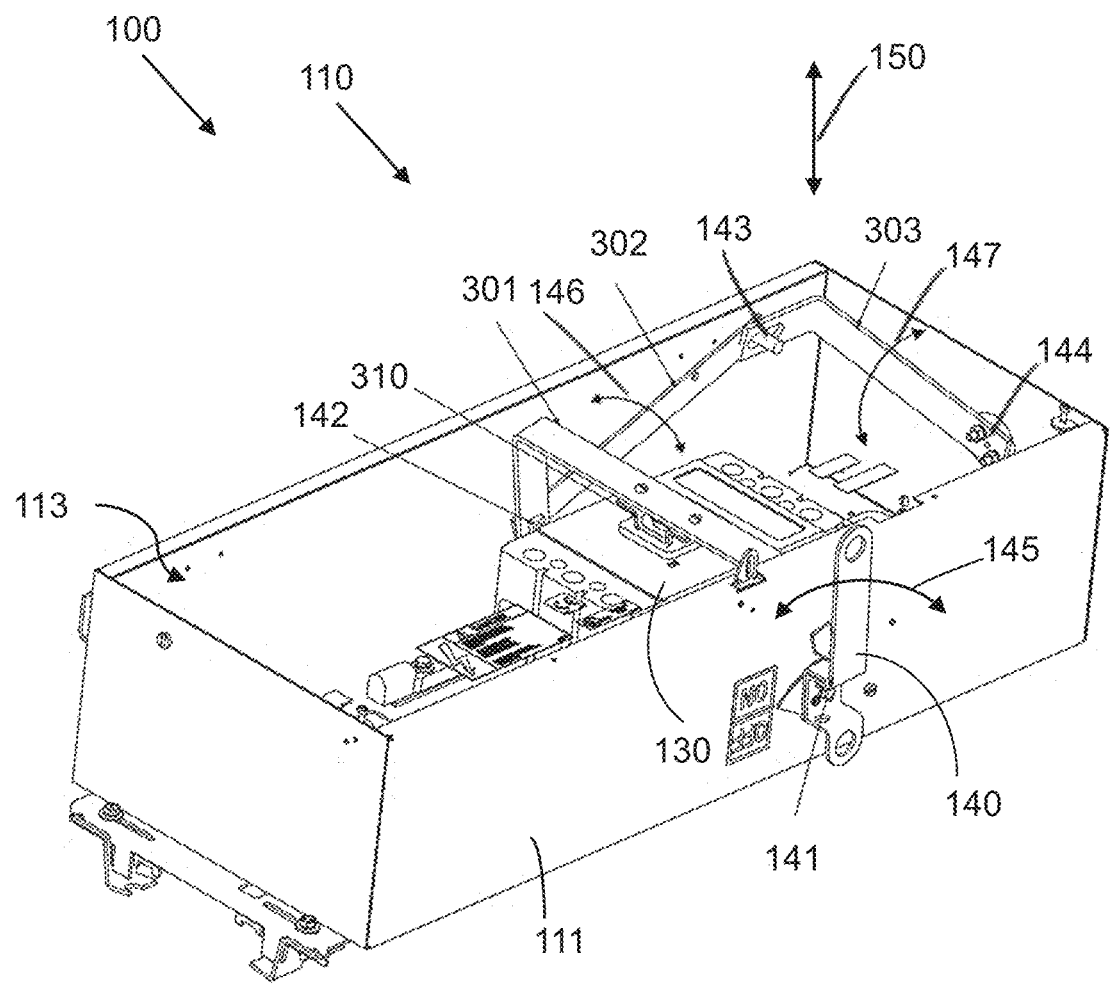
FIG. 14 illustrates a perspective view of a bus plug including mechanical linkages and an electrical switch having a control knob.

FIG. 14 illustrates the bus plug 110 with cover 112 removed for clarity to show the internal volume 113 of the housing 111. The bus plug 110 includes an external handle 140 coupled to mechanical linkages 301-303 contained within the housing 111. Operation of the handle 140 (e.g., rotation in direction 145) causes the mechanical linkages 301-303 to move. Compared to some bus plugs, where operation or control of the switch 130 would require a user to access the internal volume 113 of the bus plug 110 to, for example, interact with the electrical switch 130, the external handle 140 of the present disclosure enables a user to operate the electrical switch 130 without having to access the internal volume 113 of the bus plug 110 and without having to dismantle the housing 111. Because high electrical voltages are commonly present within the internal volume 113 of the housing 111, the ability to operate the switch 130 with the external handle 140 increases safety and reduces time spent by a user to operate the switch 130.

The bus plug 110 of the present disclosure may comply with various regulator and safety standards that other bus plugs may not. For example, the bus plug 110 includes an external handle 140 for convenient operation of a switch 130 and is constructed so as not to present a risk of fire, electric shock, or injury to persons. The enclosure of the bus plug 110 (e.g., housing 111) completely enclose all live parts that may be housed in it. Additionally, as discussed more fully below, the structure of the handle 140 and mechanical linkages 301-303 provides a mechanical interlock having the necessary mechanical strength to ensure reliable and positive mechanical performance.

For example, a first transverse bar 301 is coupled to the handle 140 at pivot joint 141. A linking bar 302 is coupled to the transverse bar 301 at pivot joint 142. The linking bar 302 extends between the first transverse bar 301 and a second transverse bar 303. The linking bar 302 and the second transverse bar 303 are coupled at sliding joint 143. The second transverse bar 303 is coupled to the housing 111 at pivot joint 144. In some embodiments, the second transverse bar 303 can be coupled to an optional external handle (not shown) at pivot joint 144. Rotation of the handle 140 or the optional handle (not shown) causes the mechanical linkages 301-303 to move in a predetermined configuration.

For example, rotation of handle 140 along direction 145 causes the first transverse bar 301 to rotate in direction 145 about pivot joints 141, 142. Rotation of the first transverse bar 301 causes linking bar 302 to rotate along direction 146 about pivot joint 142 causing sliding joint 143 to move along linear direction 150. The movement of sliding joint 143 causes the second transverse bar 303 to rotate along direction 147 about pivot joint 144.

Figure 15:
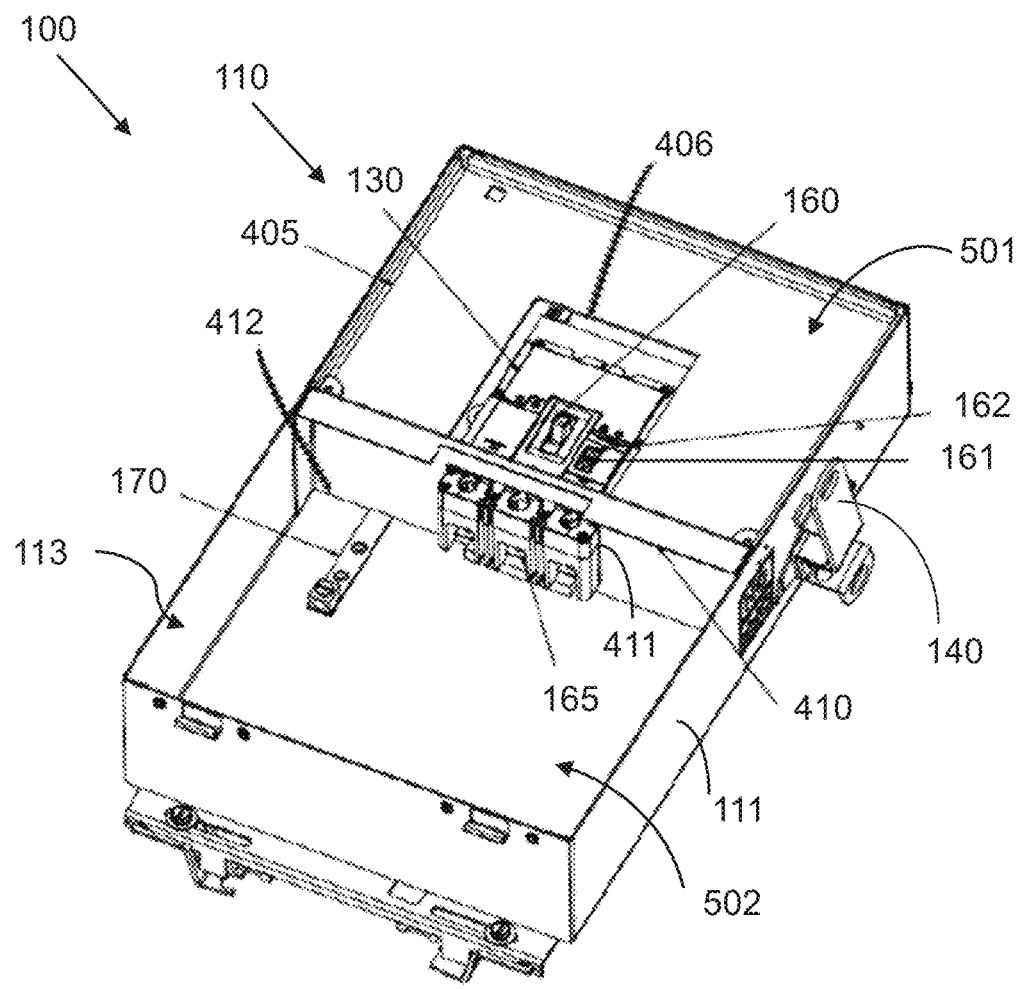
FIG. 15 illustrates the bus plug of FIG. 2 including a partition and a line side cover with the mechanical linkages removed for clarity.

An adaptor bracket 310 is fixed to the first transverse bar 301 and is moveable with the first transverse bar 301. The electrical switch 130 is positioned in the housing 111, and the adaptor bracket 301 is oriented such that when the mechanical linkages 301-303 are operated, movement of the first transverse bar 301 causes the adaptor bracket 310 to interact with a control knob 160 (See FIG. 15) of the electrical switch 130 to place the bus plug 110 in either an energized or de-energized state. Operation of the handle 140 and the mechanical linkages 301-303 in the opposite direction along 145 causes the adaptor bracket 310 to move with the first transverse bar 303 to interact with the control knob 160 of the electrical switch 130 to place the bus plug 110 in a de-energized or energized state. As shown in FIG. 15, with the first transverse bar 301 removed for clarity, the control knob 160 is illustrated as a lever having at least two positions 161, 162 (e.g., ON/OFF). The control knob 160 can also be provided as a switch, a button, or other control device having at least two positions 161, 162 configured to operate the electrical switch 130.

As further shown in FIG. 15, in some embodiments, the bus plug 110 can include a partition wall 410 separating the internal volume 113 of the housing 111 into a line side 501 and a load side 502. The line side 501 is defined by the side into which electrical current from a power source is provided and the load side 502 is defined as the side from which electrical to a load source is taken. By separating the line side 501 from the load side 502 with the partition wall 410, a technician working on the bus plug (e.g., installing, repairing, replacing, inspecting, upgrading) encounters the partition wall 410 and can be deterred from contacting live power on the line side 510, thus improving safety.

The partition wall 410 includes an opening 411 providing access to load connectors 165 of the electrical switch 130 from the load side 502, such that a technician can electrically connect a load source to the load connectors 165 from the load side 502. At least a portion of the load connectors 165 of the electrical switch 130 extends from the line side 501 through the opening 411 of the partition wall 410 to the load side 502. Additionally, a ground connector 170 can extend from the line side 501 across the partition wall 410 to the load side 502. The ground connector 170 can extend through another opening (not shown) of the partition wall 410, or as shown, can extend underneath a bottom edge 412 of the partition wall 410. Similarly, a neutral terminal (not shown) can extend through or under the partition wall 410.

The bus plug 110 can include a line side cover 405 obstructing access from a location outside the internal volume 113 of the housing 111 into the line side 501 of the bus plug 110. The line side cover 405 extends from the partition wall 410 in a direction away from the load side 502 and the partition wall 410 and obstructs access to the line side 501. The line side cover 405 includes an opening 406 providing access to at least the control knob 160 of the electrical switch 130 such that the control knob 160 can be operated while the line side cover 405 obstructs access to the line side 501. In some embodiments, at least a portion of the control knob 160 extends from the line side 501 through the opening 406 of the line side cover 405 to a location external to the volume defined within the housing 111 by the line side cover 405 and the partition wall 410.

Figure 16:
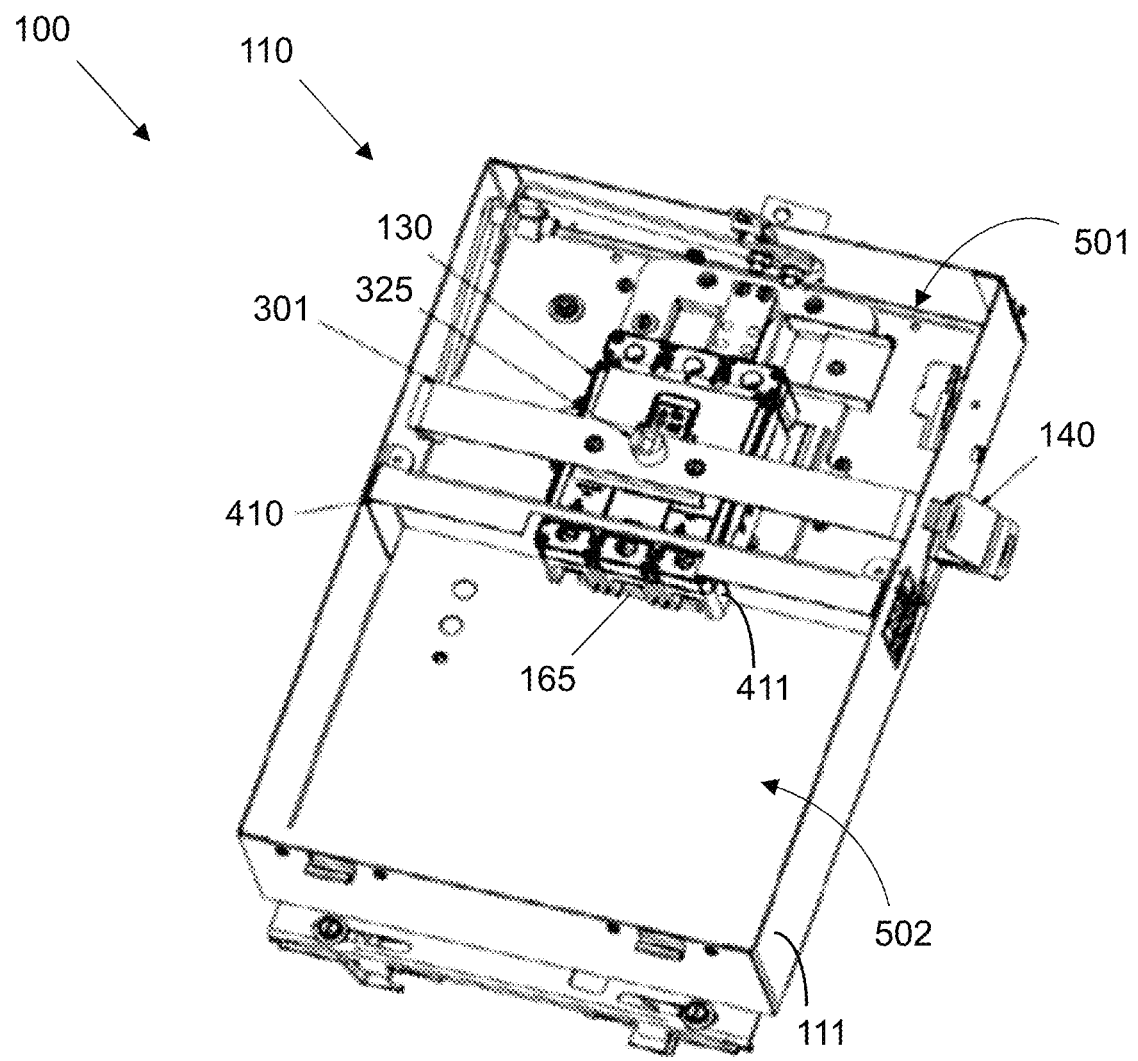
FIG. 16 illustrates the bus plug of FIG. 15 with the line side cover removed for clarity.
Figure 17:
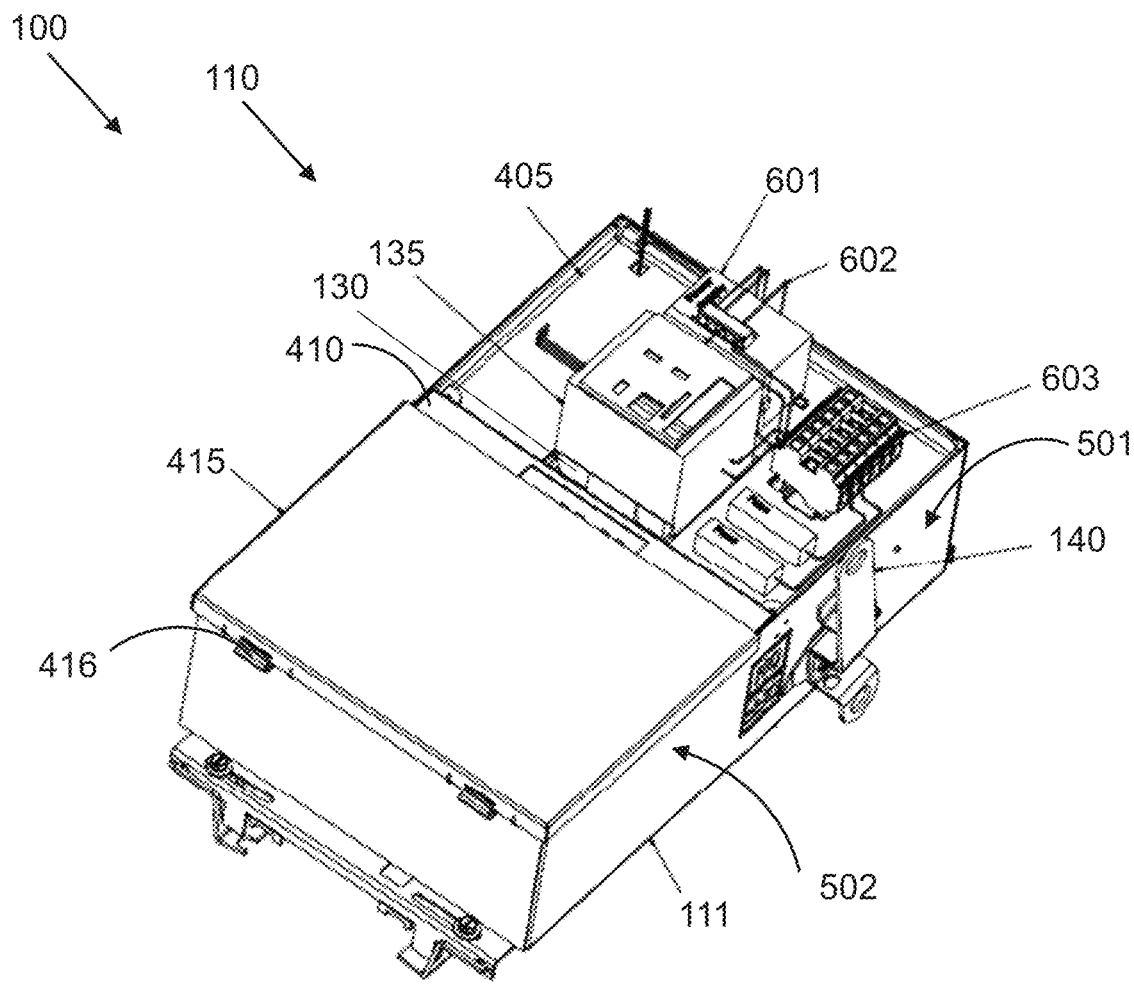
FIG. 17 illustrates the bus plug of FIGS. 14-16 including a load side cover, an actuator, a power supply, and a communication module.
Figures 18, 19:
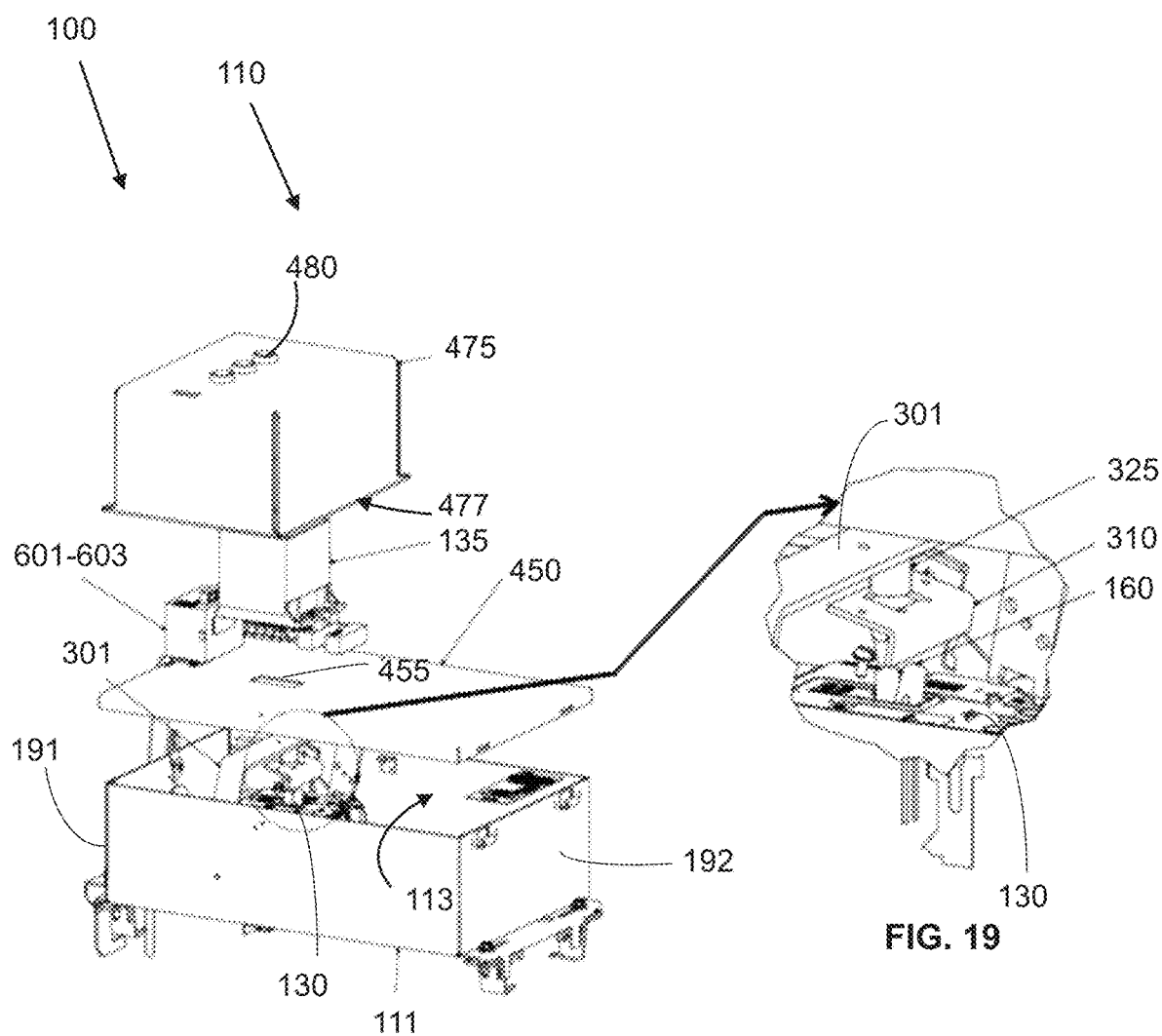
FIG. 18 illustrates an exploded perspective view of an alternate embodiment of a bus plug including a housing cover and an enclosure cover.
FIG. 19 illustrates a detail view of a portion of the bus plug and electrical switch of FIG. 18.

FIG. 16 shows the bus plug 110 of FIG. 15 with the line side cover 405 removed for clarity and the first transverse bar 301 included. The first transverse bar 301 further includes an actuator adaptor coupling 325 that is mounted to the transverse bar 301 facing away from the internal volume 113 of the housing 113. The actuator adaptor coupling 325 is oriented to interact with the actuator 135, as shown in FIGS. 17-19. For example, as shown in FIG. 17, the actuator 135 is positioned over the opening 406 of the line side cover 405 with an end effector (not shown) of the actuator 135 coupled to the actuator adaptor coupling 325 through the opening 406. In some embodiments, at least a portion of the actuator adaptor coupling 325 extends through the opening 406 of the line side cover 405 into a volume of the line side defined within the housing 111 by the line side cover 405 and the partition wall 410.

As illustrated, the line side cover 405 can provide a platform on to which additional components 601, 602, 603 (e.g., transmitters, relays, electro-mechanical devices, sensors) can be positioned. Alternatively, one or more of the additional components 601-603 can be located within the volume defined by the housing 111 by the line side cover 405 and the partition wall 410. The additional components 601-603 can be configured to receive commands from the communication module 210 (FIG. 2) and use those commands to control the actuator 135.

The bus plug 110 can include a load side cover 415 obstructing access from a location outside the internal volume 113 of the housing 111 into the load side 502 of the bus plug 110. The load side cover 415 extends from the partition wall 410 in a direction away from the line side 501 and the partition wall 410 and obstructs access to the load side 502. The load side cover 415 can be rotatably mounted with hinges 416 relative to the housing 111 of the bus plug 110 such that a technician can selectively rotate the load side cover 415 about the hinges 416 to selectively access or obstruct access to the load side 502. In further embodiments, the load side cover 415 may latch on to the housing 111 or mount to the housing 111 with fasteners to couple the load side cover 415 to the housing 111.

FIG. 18 illustrates an exploded view of the bus plug 110 having a housing cover 450 instead of the line side cover 405 and the load side cover 415. The housing cover 450 is a single cover that obstructs access from a location outside the internal volume 113 of the housing 111 into both the line side 501 and the load side 502 of the bus plug 110. The housing cover 450 extends from one end 191 of the bus plug 110 to an opposite end 192, spanning the entire width of the bus plug 110. The embodiment shown in FIG. 17 is provided with the partition wall 410 with the understanding that the partition wall 410 can be included in further embodiments to separate the line side 501 from the load side 502.

The partition wall 410 can be a separate component or can be an integral component with the housing 111, the housing cover 450, the line side cover 405, or the load side cover 415.

The housing cover 450 includes an opening 455 providing access to at least the control knob 160 (see FIG. 19) of the electrical switch 130 such that the control knob 160 can be operated while the housing cover 450 obstructs access to the line side 501 and the load side 502. In some embodiments, at least a portion of the control knob 160 extends from the internal volume 113 of the housing 111 through the opening 455 of the line side cover 450 to a location external to the internal volume 113 defined within the housing 111 by the housing cover 450. Alternatively, at least a portion of the actuator adaptor coupling 325 extends through the opening 455 of the housing cover 415 into the internal volume 113 of the housing 111.

FIG. 19 illustrates an enlarged view of a portion of FIG. 18 showing the actuator adaptor coupling 325 connected to the first transverse bar 301 and configured to interact with the control knob 160 to operate the electrical switch 130. The actuator adaptor coupling 325 can interact with the adaptor bracket 310 and cause the adaptor bracket 310 to interact with the control knob 160. For example, the actuator 135 can be a rotary actuator (e.g., motor) configured to impart a rotational force which the actuator adaptor coupling 325 converts to a linear force to operate the control knob 160. For example, the actuator adaptor coupling 325 can include a slider crank mechanism, a geared mechanism, a shaft, rod, rack and pinion, cam and follower, or other mechanism configured to convert a rotational force from the actuator 135 to a linear force that operates the control knob 160 of the electrical switch 130.

As further shown in FIG. 18, the bus plug 110 can include an enclosure cover 475 configured to mount to the housing cover 450 and enclose at least the actuator 135 and, optionally, the additional components 601-603. The enclosure cover 475 defines an internal volume 477 to contain at least the actuator 135 and, optionally, the additional components 601-603. In some embodiments, the enclosure cover 475 can include one or more indicators 480 configured to visual communicate a status or parameter of the bus plug 110 to a user. For example, the indicators 480 can include one or more lights that illuminate one color (e.g., green) when the bus plug 110 is functioning properly and a different color (e.g., red) when the bus plug 110 detects an error or malfunction.

Figure 20:
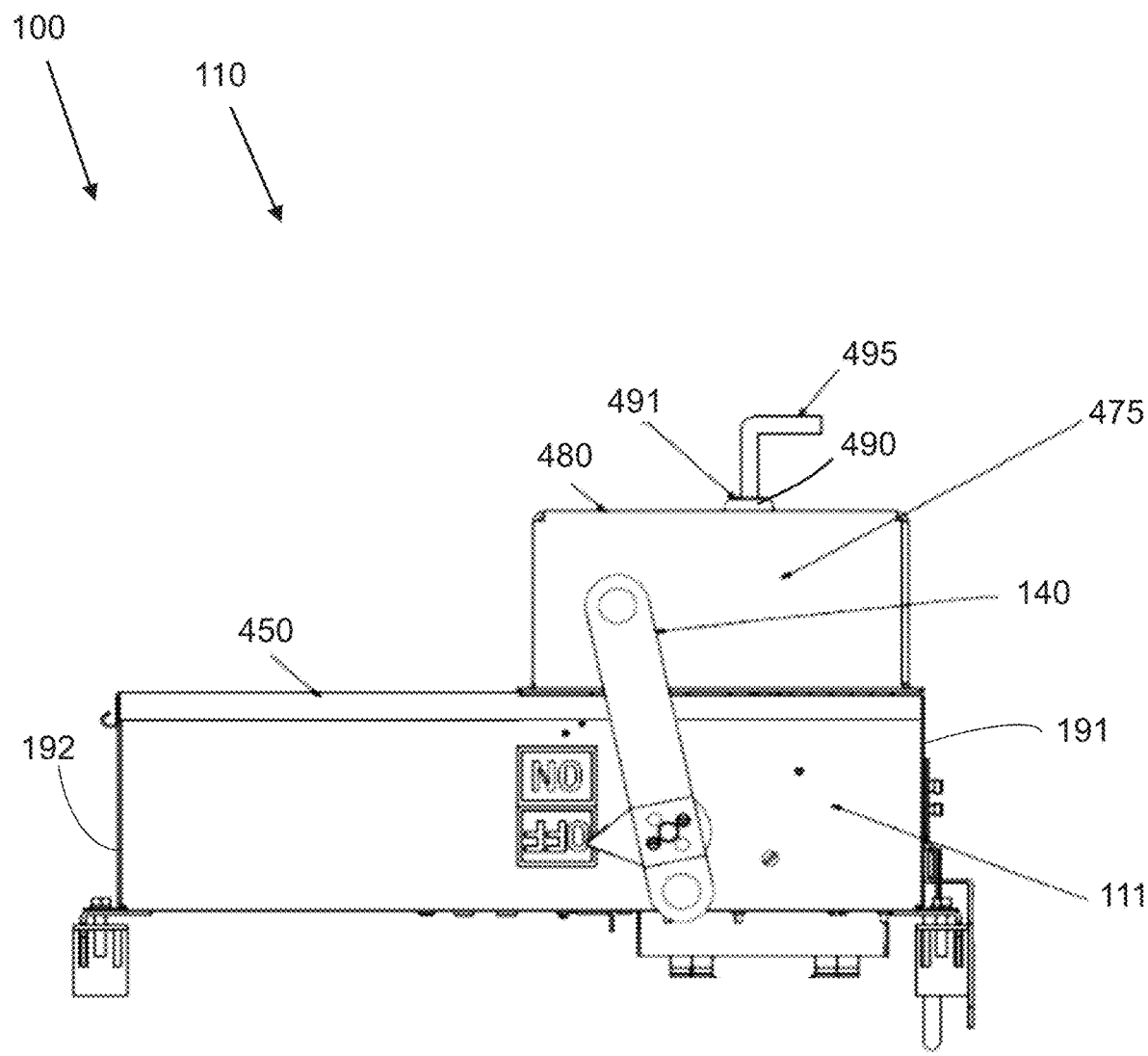
FIG. 20 illustrates a side view of the bus plug of FIG. 18 and FIG. 19.

FIG. 20 shows a side view of the bus plug 110 illustrated in FIG. 17 having the line side cover 405 and the load side cover 415 with the enclosure cover 475 mounted to the line side cover 405. In some embodiments, the enclosure cover 475 can include an opening 490 through which a receiver and/or transceiver cable 495 of a receiver and/or transceiver 604 extends (see FIGS. 21-23). In some embodiments, the opening 490 can include a bushing 491 that insulates contact between the antenna 495 and the opening 490 to prevent electronic disturbance and damage to the sheath of the antenna 495.

Figure 21:
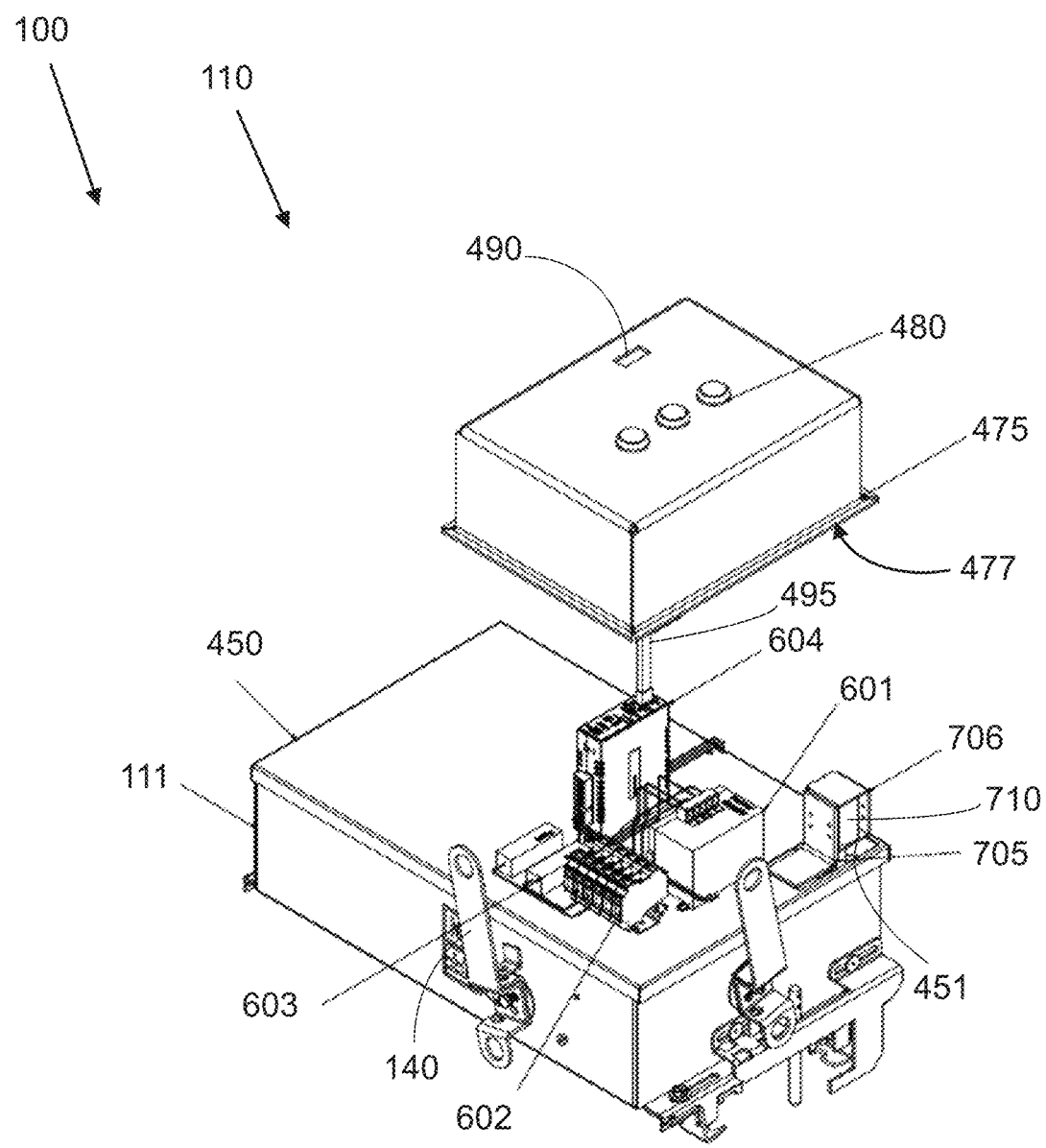
FIG. 21 illustrates a partial exploded perspective view of an alternate embodiment of a bus plug including an actuator mounted to a cover.

FIG. 21 shows a partially exploded view of the bus plug 110 with enclosure cover 475 separated from the housing cover 450. A communication antenna 495 of receiver and/or transceiver 604 may extend from the internal volume 477 of the enclosure cover 475 through the opening 490 to a location external to the internal volume 477 and the internal volume 113 of the housing 111. Positioning at least a portion of the antenna 495 outside the internal volumes 113, 477 can improve the signal quality and range of communication between the communication module 210 (FIG. 2) and the receiver and/or transceiver 604 that, together with additional components 601-603, controls operation of the actuator 135.

Figure 22:
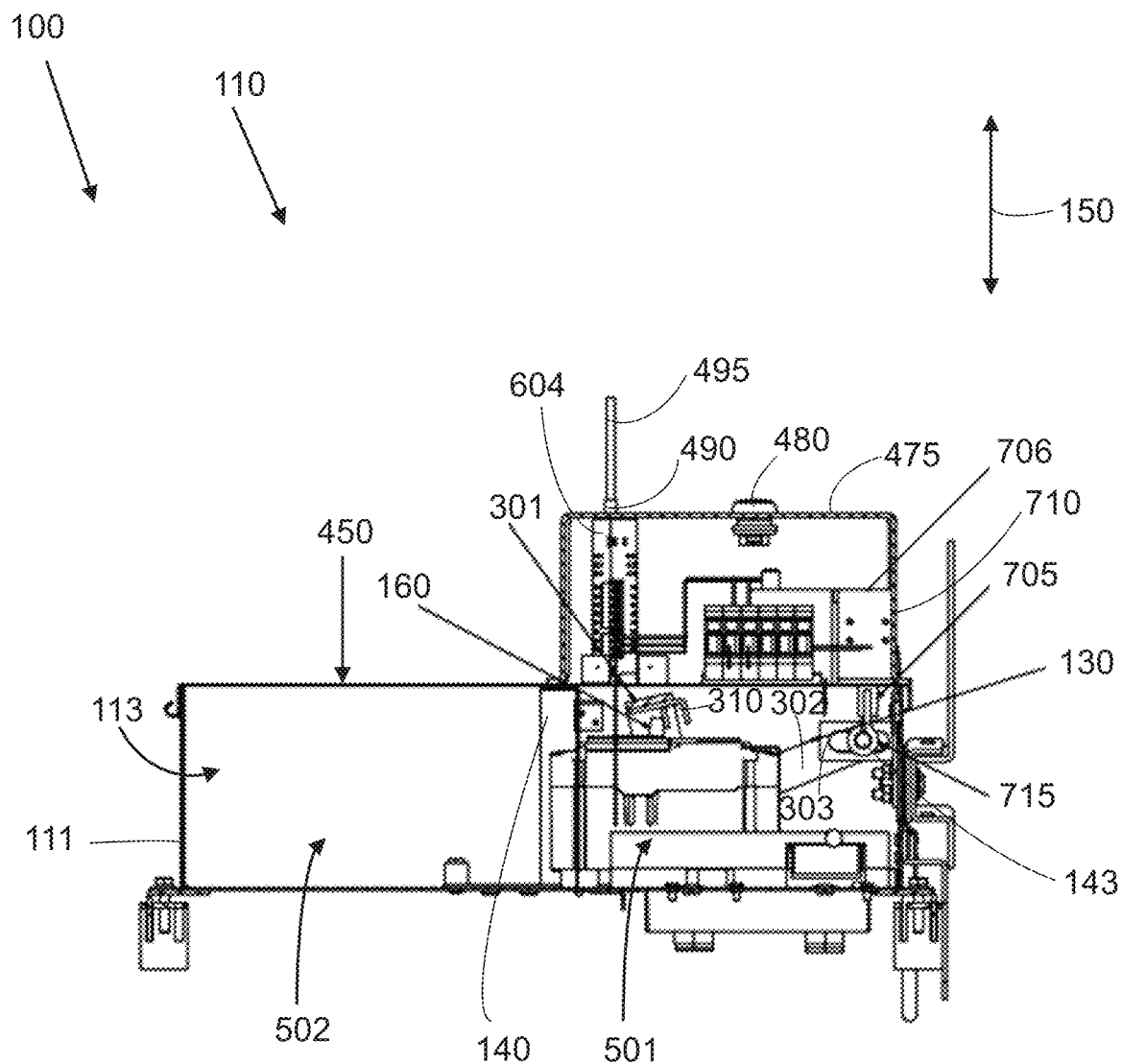
FIG. 22 shows a cut-away side view of the bus plug shown in FIG. 21.

FIG. 21 further illustrates an alternate embodiment of the bus plug 110 including an actuator provided as a solenoid 710 with a plunger 705. The solenoid 710 is mounted to the cover housing 450 with bracket 706, and the plunger 705 extends through opening 451 in housing cover 450 into the internal volume 113 of the housing 111. FIG. 22 shows a side cut-away view of the bus plug 110 shown in FIG. 21. The plunger 705 of the solenoid 710 is moveable along direction 150 and includes a plunger coupling 715 coupling the plunger 705 to the slide joint 143. As described with respect to FIG. 14, movement of the slide joint 143 along direction 150 causes mechanical linkages 301-303 to move. Based on the movement of the mechanical linkages 301-303, the adaptor bracket 310 interacts with the control knob 160 of the electrical switch 130 to energize or de-energize the bus plug 110. As described with respect to actuator 135, the receiver and/or transceiver 604, together with additional components 601-603, controls operation of the solenoid 710 based on commands communicated by the communication module 210 and remote application 205.

Figure 23:
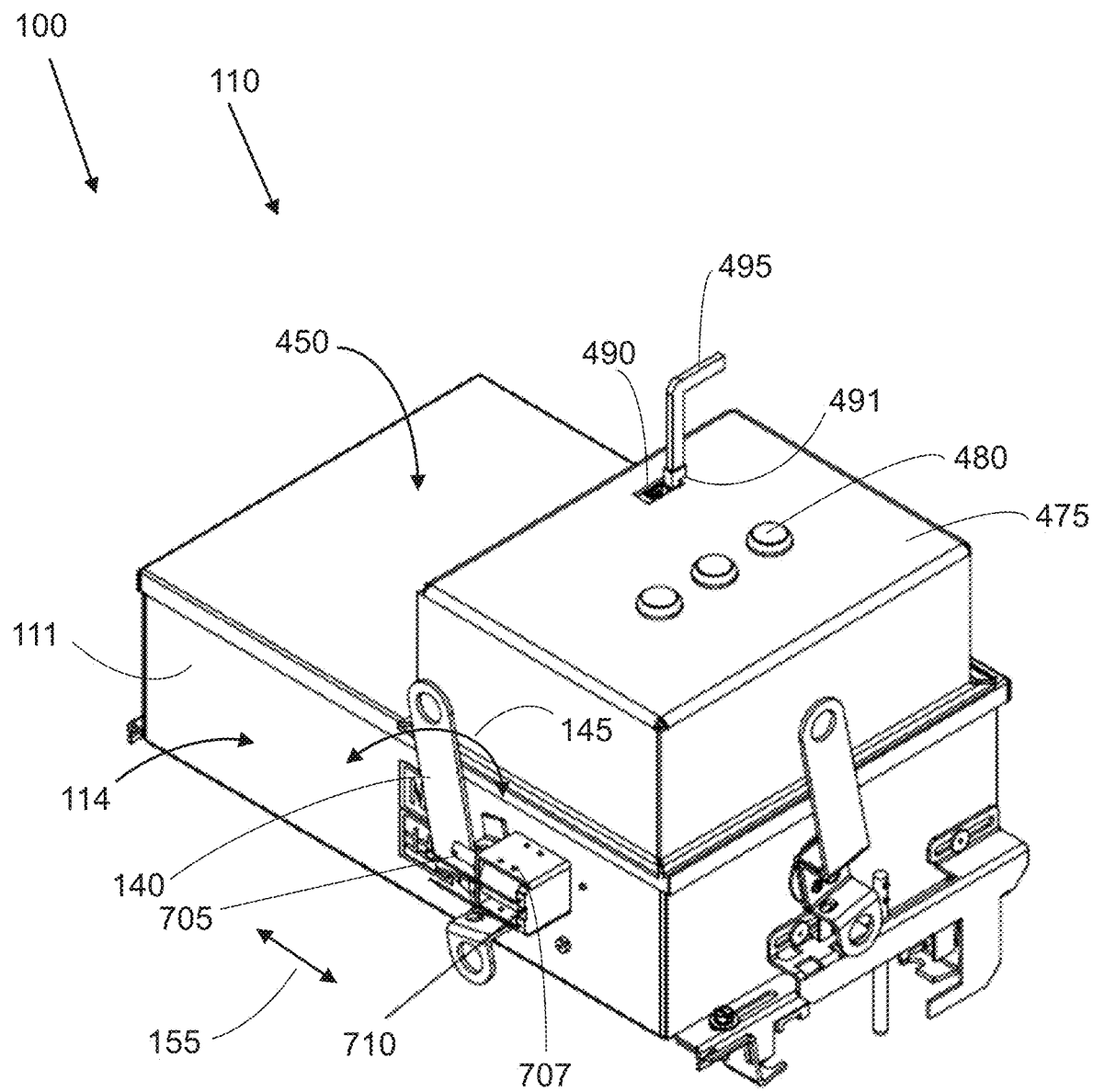
FIG. 23 illustrates perspective view of an alternate embodiment of a bus plug including an actuator mounted to a side of the housing.

FIG. 23 illustrates an alternate embodiment of the bus plug 110 including solenoid 710 mounted to an external surface 114 of the housing 111 with bracket 707. The plunger 705 of the solenoid 710 is coupled to the external handle 140 and is moveable along direction 155. Movement of the plunger 705 causes the handle 140 to rotate along direction 145 about pivot joint 141. As described with respect to FIG. 14, movement of the handle 140 along direction 145 causes mechanical linkages 301-303 to move. Based on the movement of the mechanical linkages 301-303, the adaptor bracket 310 interacts with the control knob 160 of the electrical switch 130 to energize or de-energize the bus plug 110.

Features of the power distribution system 100 can be provided either alone or in combination to remotely control the actuator 135 or the solenoid 710 to interact with the control knob 160 and operate the electrical switch 130.

Figure 24:
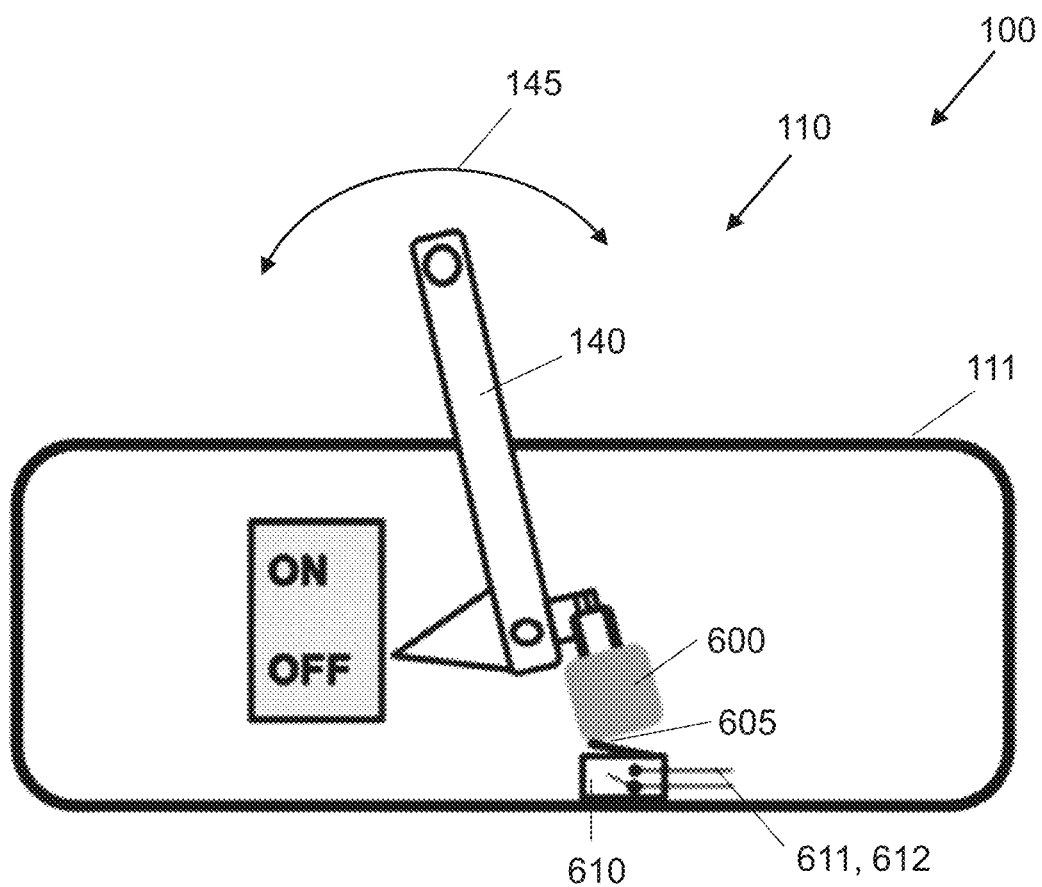
FIG. 24 is a schematic illustration of a bus plug including a manual lock and a limit switch.

FIG. 24 schematically illustrates the bus plug 110 having a mechanical lock 600 (e.g., padlock, key lock). The mechanical lock 600 is provided as a safety override to mechanically control energization of the bus plug 110. For example, the mechanical lock 600 can be attached to an external handle 140 of the bus plug 110. Based on mechanical linkage, operation of the handle 140 (e.g., rotation in direction 145) operates the lever or control knob of the electrical switch 130 (FIG. 2) to place the bus plug 110 in either an energized or de-energized state. The mechanical lock 600 maintains the handle 140 in the particular state until the lock 600 is removed and the handle 140 is operated (e.g., in the opposite direction along 145) to de-energize or energize the bus plug 110. Such feature may be referred to as lock-out-tag-out.

The bus plug 110 includes a limit switch 610 configured to contact the mechanical lock 600 when the mechanical lock 600 is positioned in a predetermined position (e.g., locked onto handle 140). The limit switch 610 includes a mechanical actuator 605 operated by the mechanical lock 600. For example, when the mechanical lock 600 is attached to the external handle 140 of the bus plug 110, the mechanical actuator 605 of the limit switch 610 is operated.

The limit switch 610 is connected to the communication module 210 (FIG. 2) via a wired 611a or wireless 612a connection. The communication module 210 and remote application 205 are configured to restrict operation of the bus plug 110 when the mechanical actuator 605 of the limit switch 610 is contacted by the mechanical lock 600. Thus, when the external handle 140 is locked in either the ON or OFF position, control of the bus plug 110 with the remote application 205 and communication module 210 is restricted. In some embodiments, the monitoring capabilities of the bus plug 110 may continue even when the bus plug 110 is locked. Similarly, when the bus plug 110 is locked, the limit switch 610 can be configured to notify or signal the remote application 205 of the energization status of the bus plug 110 via wired 611 or wireless 612 connection.

Once the mechanical lock 405 is removed from the external handle 140, the actuator 605 of the limit switch 610 is de-activated and operation of the bus plug 110 with the communication module 210 and the remote application 205 is restored. Providing both a manual operation and a remote operation option enables the bus plug 110 to satisfy industry standards and regulations (e.g., UL/CSA). The communication module 210 and remote application 205 of the power distribution system 100 are provided either alone or in combination to monitor and control the bus plug 110 or the plurality of bus plugs 300, thereby providing safe and effective distribution of electrical power.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A power distribution system comprising:
   a plurality of bus plugs, wherein each of a respective bus plug of the plurality of bus plugs includes:
      an electrical switch having a control knob, the electrical switch being configured to selectively control a corresponding energization of the respective bus plug, and
      an actuator operable to physically engage the control knob of the electrical switch to impart a first force on the control knob to physically move the control knob of the electrical switch from an on position to an off position and to impart a second force on the control knob to physically move the control knob of the electrical switch from the off position to the on position;
   a remote application having commands defining the energization of at least one of the plurality of bus plugs; and
   a communication module configured to communicate the commands from the remote application to the at least one of the plurality of bus plugs, and wherein the actuator receives the commands from the communication module, which causes the actuator to physically move the control knob of the electrical switch.

2. The system of claim 1, wherein the communication module is configured to communicate the commands from the remote application to each bus plug of the plurality of bus plugs.

3. The system of claim 1, wherein the remote application includes a mobile or web-based application.

4. The system of claim 1, wherein the plurality of bus plugs communicate over a wired or wireless connection having a daisy chain configuration.

5. The system of claim 1, wherein the plurality of bus plugs communicate over a wired or wireless connection having an open loop daisy chain configuration.

6. The system of claim 1, wherein the plurality of bus plugs communicate over a wired or wireless connection having a closed loop daisy chain configuration.

7. The system of claim 1, wherein each bus plug of the plurality of bus plugs includes a measurement device configured to monitor one or more parameters of the respective bus plug, and wherein the communication module is configured to communicate the one or more parameters from the measurement device to the remote application.

8. The system of claim 1, wherein each bus plug of the plurality of bus plugs includes a handle operable to control the electrical switch.

9. A power distribution system comprising:
   a plurality of bus plugs that communicate over a wired or wireless connection, wherein each of a respective bus plug of the plurality of bus plugs includes:
      an electrical switch configured to selectively control a corresponding energization of the respective bus plug, the electrical switch having a control knob;
      an actuator operable to physically engage the control knob of the electrical switch to impart a first force on the control knob to physically move the control knob of the electrical switch from an on position to an off position, and to impart a second force on the control knob to physically move the control knob of the electrical switch from the off position to the on position; and
      a handle operable to control the electrical switch.

10. The system of claim 9, wherein the connection has a daisy chain configuration.

11. The system of claim 9, wherein the connection has an open loop daisy chain configuration.

12. The system of claim 9, wherein the connection has a closed loop daisy chain configuration.

13. A bus plug comprising:
    an electrical switch configured to selectively control energization of the bus plug, the electrical switch having a control knob;
    an actuator operable to physically engage the control knob of the electrical switch to impart a first force on the control knob to physically move the control knob of the electrical switch from an on position to an off position, and to impart a second force on the control knob to physically move the control knob of the electrical switch from the off position to the on position; and
    a measurement device configured to monitor one or more parameters of the bus plug; wherein at least one of the electrical switch, the actuator, and the measurement device is configured to communicate with a communication module over a wired or wireless connection; and wherein the actuator is configured to receive commands from the communication module and physically move the control knob of the electrical switch in response to the commands.

14. The bus plug of claim 13, wherein the at least one of the actuator and the electrical switch is configured to de-energize the bus plug in response to measurement of the predetermined parameter.

15. The bus plug of claim 14, wherein operation of the at least one of the actuator and the electrical switch is automatic in response to measurement of the predetermined parameter.

16. The bus plug of claim 13, wherein at least one of the electrical switch, the actuator, and the measurement device is configured to communicate the predetermined parameter to the communication module over the wired or wireless connection.

17. The bus plug of claim 13, wherein the predetermined parameter is one or more of a current, a voltage, a power, a temperature, a time, and a location of the bus plug.

18. The bus plug of claim 13, including a handle operable to control the electrical switch.

19. The bus plug of claim 18, wherein at least one of the electrical switch, the actuator, and the measurement device is configured to communicate a position of the handle to the communication module over the wired or wireless connection.

20. The bus plug of claim 13, wherein the measurement device is configured to continuously monitor the one or more parameters in real-time.

* * * * *